US00RE49737E

(19) United States
(12) Reissued Patent
Maejima et al.

(10) Patent Number: US RE49,737 E
(45) Date of Reissued Patent: Nov. 28, 2023

(54) BALL BEARING

(71) Applicant: NSK LTD., Tokyo (JP)

(72) Inventors: Takeshi Maejima, Kanagawa (JP); Takanori Tanaka, Kanagawa (JP); Youichi Matsumoto, Kanagawa (JP)

(73) Assignee: NSK LTD., Tokyo (JP)

(21) Appl. No.: 16/593,123

(22) Filed: Oct. 4, 2019

Related U.S. Patent Documents

Reissue of:
(64) Patent No.: 8,777,489
Issued: Jul. 15, 2014
Appl. No.: 13/959,088
Filed: Aug. 5, 2013

U.S. Applications:
(62) Division of application No. 13/059,077, filed as application No. PCT/JP2009/070711 on Dec. 10, 2009, now Pat. No. 8,523,450.

(30) Foreign Application Priority Data

Dec. 10, 2008 (JP) ..... 2008-314389
Dec. 10, 2008 (JP) ..... 2008-314390

(51) Int. Cl.
*F16C 33/66* (2006.01)
*F16C 33/58* (2006.01)
*F16C 33/41* (2006.01)

(52) U.S. Cl.
CPC ..... *F16C 33/6674* (2013.01); *F16C 33/418* (2013.01); *F16C 33/583* (2013.01);
(Continued)

(58) Field of Classification Search
CPC ..... F16C 33/664; F16C 33/6659; F16C 3 3/6674; F16C 33/6681; F16C 33/6685; F16C 33/583; F16C 33/416; F16C 33/418
See application file for complete search history.

(56) References Cited

U.S. PATENT DOCUMENTS 2,272,757 A * 2/1942 Teker ..... 384/466
6,416,230 B1 * 7/2002 Staudigel et al. ..... 384/523
(Continued)

FOREIGN PATENT DOCUMENTS

JP 63-172617 A 7/1988
JP 63-141329 U 9/1988
(Continued)

OTHER PUBLICATIONS

English translation of JP-2009156422-A retrieved from EPO's Espacenet Patent Search using Advanced Search feature accessed at <https://worldwide.espacenet.com/advancedSearch?locale=en_EP>.*

(Continued)

*Primary Examiner* — Peter C English
(74) *Attorney, Agent, or Firm* — Sughrue Mion, PLLC

(57) ABSTRACT

A ball bearing includes an inner ring having a raceway surface, an outer ring having a raceway surface, a plurality of rolling elements rollably disposed between the raceway surface of the inner ring and the raceway surfaces of the outer ring, and a resin cage configured to retain the plurality of rolling elements between the inner ring and the outer ring. The cage is a crown type cage having an annular base portion and a plurality of pockets formed in [an axial end face of] the annular base portion, in which the pockets retain the rolling elements. An axial distance between an axial position of a center of gravity of the cage and a curvature center of a spherical or cylindrical inner surface of each of the pockets is 0.6 or more times a radius of curvature of the inner surface. [A hybrid vehicle transmission has this ball bearing.]

2 Claims, 11 Drawing Sheets

AMENDED

(52) U.S. Cl.
CPC ..... *F16C 33/664* (2013.01); *F16C 33/6659* (2013.01); *F16C 33/6681* (2013.01); *F16C 33/416* (2013.01)

(56) References Cited

U.S. PATENT DOCUMENTS

| | | | | |
|---|---|---|---|---|
| 8,157,449 | B2 | 4/2012 | Doyer et al. | |
| 2002/0102040 | A1* | 8/2002 | Koiwa et al. | 384/474 |
| 2008/0187261 | A1* | 8/2008 | Tanaka et al. | F16C 33/418 384/470 |

FOREIGN PATENT DOCUMENTS

| | | | | | |
|---|---|---|---|---|---|
| JP | 63141329 | U | | 9/1988 | |
| JP | 5-34317 | U | | 5/1993 | |
| JP | 534317 | U | | 5/1993 | |
| JP | 8-145061 | A | | 6/1996 | |
| JP | 9-79265 | A | | 3/1997 | |
| JP | 2000-120703 | A | | 4/2000 | |
| JP | 2000-291662 | A | | 10/2000 | |
| JP | 2001-027253 | A | | 1/2001 | |
| JP | 200127253 | A | | 1/2001 | |
| JP | 2001-208076 | A | | 8/2001 | |
| JP | 2001-336535 | A | | 12/2001 | |
| JP | 2002-295480 | A | | 10/2002 | |
| JP | 2004-084768 | A | | 3/2004 | |
| JP | 2004-84768 | A | | 3/2004 | |
| JP | 2004245231 | A | | 9/2004 | |
| JP | 2006-17178 | A | | 1/2006 | |
| JP | 2006-017178 | A | | 1/2006 | |
| JP | 2006125485 | A | | 5/2006 | |
| JP | 2006-214470 | A | | 8/2006 | |
| JP | 2007-032674 | A | | 2/2007 | |
| JP | 2007-32674 | A | | 2/2007 | |
| JP | 2007303600 | A | | 11/2007 | |
| JP | 2008-175257 | A | | 7/2008 | |
| JP | 2008-202682 | A | | 9/2008 | |
| JP | 2008-202798 | A | | 9/2008 | |
| JP | 2009156422 | A | * | 7/2009 | F16C 33/6674 |
| JP | 2009162262 | A | * | 7/2009 | F16C 33/416 |
| JP | 2009174603 | A | * | 8/2009 | F16C 33/785 |
| JP | 2009275759 | A | * | 11/2009 | F16C 33/785 |

OTHER PUBLICATIONS

English translation of JP-2009162262-A retrieved from EPO's Espacenet Patent Search using Advanced Search feature.*
English translation of JP-2009174603-A retrieved from EPO's Espacenet Patent Search using Advanced Search feature.*
English translation of JP-2009275759-A retrieved from EPO's Espacenet Patent Search using Advanced Search feature.*
English translation of JP-2008202798-A retrieved from EPO's Espacenet Patent Search using Advanced Search feature.*
English translation of JP-2008175257-A retrieved from EPO's Espacenet Patent Search using Advanced Search feature.*
English translation of JP-2007303600-A retrieved from EPO's Espacenet Patent Search using Advanced Search feature.*
English translation of JP-2006214470-A retrieved from EPO's Espacenet Patent Search using Advanced Search feature.*
English translation of JP-2006125485-A retrieved from EPO's Espacenet Patent Search using Advanced Search feature.*
English translation of JP-2002295480-A retrieved from EPO's Espacenet Patent Search using Advanced Search feature.*
English translation of JP-2001027253-A retrieved from EPO's Espacenet Patent Search using Advanced Search feature.*
English translation of JP-2000291662-A retrieved from EPO's Espacenet Patent Search using Advanced Search feature.*
English translation of JP-H08145061-A retrieved from Japan Platform for Patent Information (J-PlatPat) using Simple Search feature accessed at <https://www.j-platpat.inpit.go.jp/>.*
English translation of JP-S63172617-A retrieved from Japan Platform for Patent Information (J-PlatPat) using Simple Search feature.*
Japanese Office Action dated Nov. 9, 2011 in corresponding Japanese Patent Application No. 2007-337771.
Machine translation of Japan 2002-295480 A.
Machine translation of Japan 2007-303600 A.
Machine translation of Japan 2001-027253 A.
Abstract of Japan 5-34317 U.
Machine translation of Japan 2002-295480.*
Machine translation of Japan 2007-303600.*
Machine translation of Japan 2001-27253.*
Abstract of Japan 5-34317.*
Japanese Office Action issued on Nov. 9, 2011 in the corresponding Japanese Patent Application No. 2007-337771.

* cited by examiner

FIG. 31 AMENDED
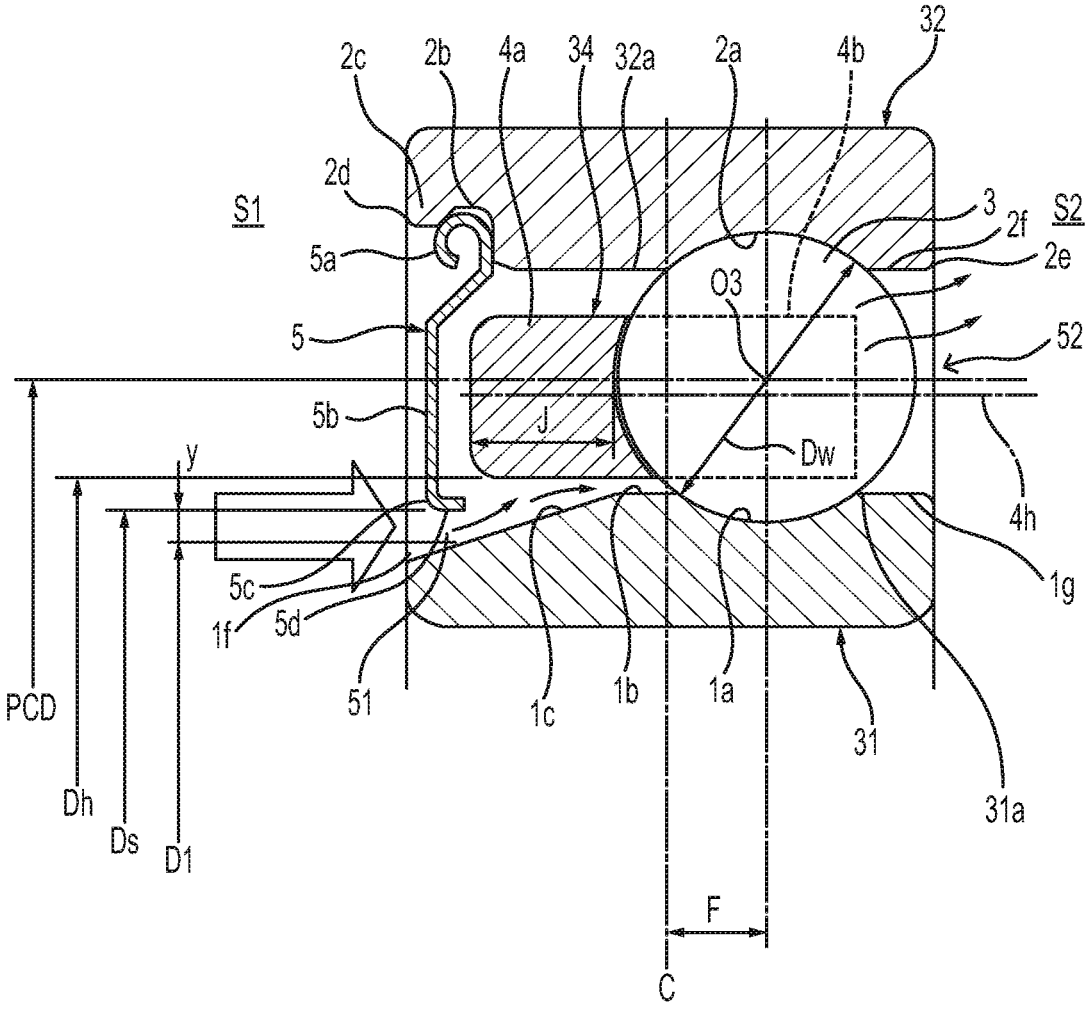

FIG. 32 AMENDED
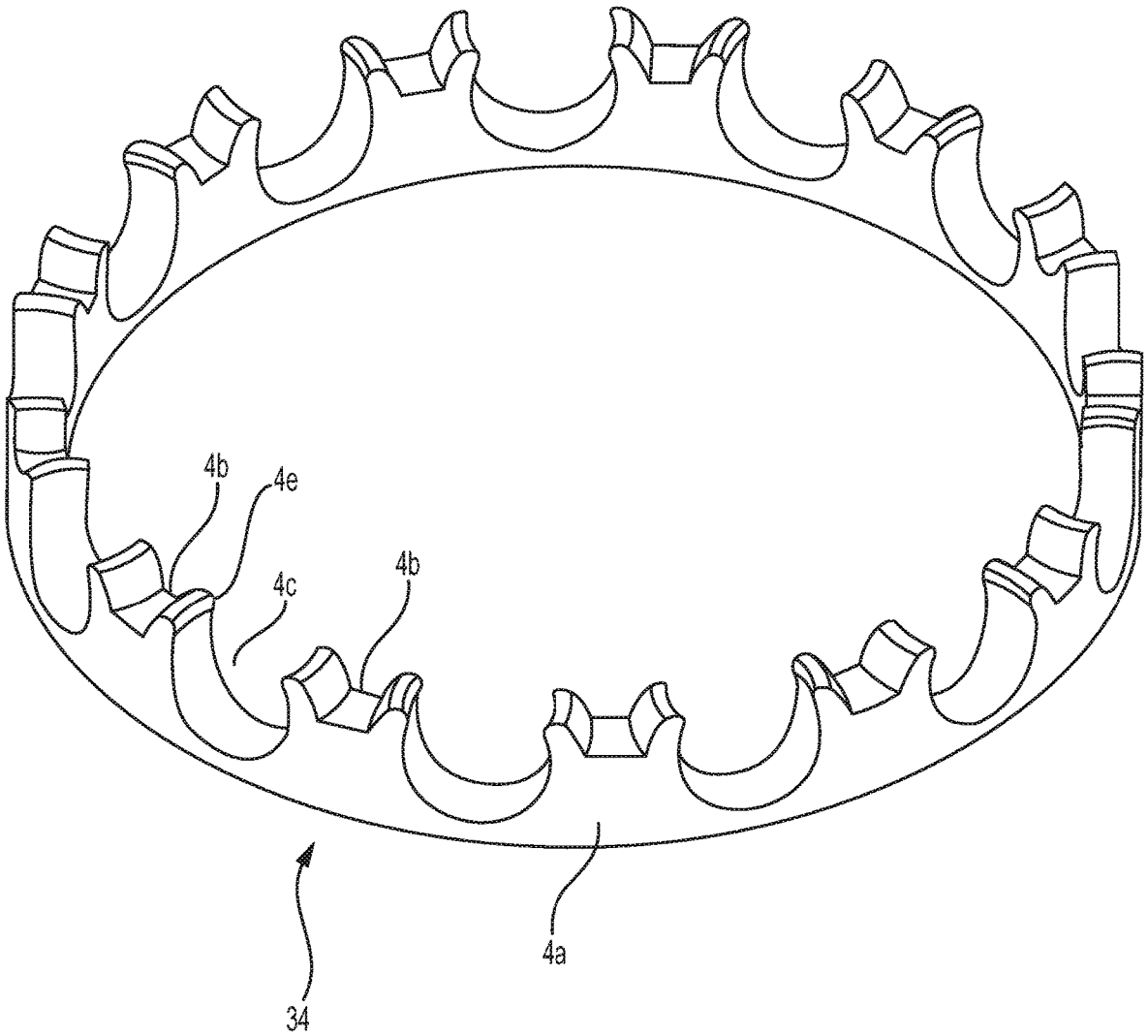

BALL BEARING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This *application is a Reissue application of U.S. Pat. No. 8,777,489, which issued on Jul. 15, 2014 and was filed on Aug. 5, 2013 as application Ser. No. 13/959,088, which* is a Divisional application of Ser. No. 13/059,077 filed on Feb. 15, 2011, which is a PCT National Stage of International Application No. PCT/JP2009/070711 filed on Dec. 10, 2009 which claims benefit to JP 2008-314390 filed on [Dec. 12, 2008] *Dec. 10, 2008*, and JP 2008-314389 filed on Dec. 10, 2008. The disclosures of which are incorporated herein by reference in their entirety.

TECHNICAL FIELD

The present invention relates to a ball bearing and a hybrid vehicle transmission.

BACKGROUND ART

FIG. 42 shows a ball bearing according to a first conventional example which is widely used to support various types of rotating portions. This ball bearing has a construction in which an inner ring 102 having an inner ring raceway 101 on an outer circumferential surface and an outer ring 104 having an outer ring raceway on an inner circumferential surface are arranged concentrically, and a plurality of balls 105 are arranged rollably between the inner ring raceway 101 and the outer ring raceway 103.

The plurality of balls 105 are retained rollably in a cage 107 shown in FIGS. 43, 44. The cage 107 is a crown type cage and is formed as a one-piece by injection molding of synthetic resin. The cage 107 includes an annular base portion 108 and a plurality of pockets 109 which are provided in [an axial end face of] the base portion 108. Each pocket 109 is formed by a recess portion 110 which is provided in [the axial end face of] the base portion 108 and a pair of elastic pieces 111 which are disposed at edges of the recess portion so as to face each other with a space provided therebetween. Facing surfaces of the pair of elastic pieces continue to an inner surface of the recess portion so as to form a spherical recess surface or cylindrical surface.

By pushing in the balls 105 individually between the pairs of elastic pieces 111 while press expanding the spaces defined therebetween by the balls 105, the cage 107 retains the balls 105 rollably in the corresponding pockets 109.

The cage 107 is formed of synthetic resin such as nylon 46, nylon 66, polyphenylene sulfide (PPS), polytetra fluorine ethylene (PTFE) and polyether ether ketone (PEEK), for example. In addition, it is known that toughness and mechanical strength can be increased under high-temperature environments by adding approximately 10 to 40 mass % reinforcement material such as glass fibers (GF) or carbon fibers (CF) to these synthetic resins.

In many cases, ball bearings like this are used under severe conditions such as high-temperature, high-speed conditions. For example, in the case of a ball bearing which is incorporated in a drive motor for a hybrid vehicle or a rotary supporting portion of an alternator, the ball bearing is used at high temperatures (100° C. or higher) and at high speeds (rotation speeds of 10000 $min^{-1}$ or faster, or 0.6 million or larger in dmn value) in many cases. Note that dm of dmn denotes bearing pitch circle diameter (in mm), and n denotes bearing rotation speed (in $min^{-1}$). In operating conditions like this, the cage 107 in the ball bearing rotates at high speeds together with lubricating oil or grease present between the outer circumferential surface of the inner ring 102 and the inner circumferential surface of the outer ring 104. Then, a complex force, which is in combination of a force directed radially outwards based on a centrifugal force, a restraining force based on the revolution of the balls 105 and stirring resistance of the lubricating oil or grease, is exerted on the cage 107 while it is rotating at high speeds.

The cage 107 repeats an irregular motion due to such a complex force and receives complex stress accompanied by an impact. Consequently, when the bearing continues to operate under the high-speed operating conditions, the cage 107 is elastically deformed or plastically deformed by the action of centrifugal force. These deformations tend to be promoted easily as the operating temperature increases. As a result, gaps between inner surfaces of the pockets 109 and rolling contact surfaces of the balls 105 come to vary largely. Further, the inner surfaces of the pockets 109 wear due to force exerted thereon from the rolling contact surfaces of the balls 105. Then, when the gaps become large, the following problems are caused.

Firstly, the cage 107 vibrates finely as the bearing rotates, whereby not only is the wear of the pockets 109 promoted, but also harmful vibration and noise are generated. Secondly, the restraint of the cage 107 by the balls 105 is released, as a result of which the cage 107 is displaced or made eccentric partly or entirely, and part of the cage 107 is caused to rub against the inner ring 102 or the outer ring 104.

For example, the elastic pieces 111 of the pocket 109 are deformed radially outwards based on the centrifugal force (see FIG. 45), and respective outer circumferential surfaces of each elastic piece 111 and the inner circumferential surface of the outer ring 104 rub against each other. When the outer circumferential surfaces and the inner circumferential surface rub against each other in such a way, there is caused a fear that the dragging torque of the bearing increased or the cage 107 breaks. In addition, when the wear progresses further, the cage 107 comes out of the bearing, and the bearing is disassembled, causing a fear that serious damage is made to the bearing unit.

In order to solve these problems, a resin cage including a metallic reinforcement member is proposed (see, e.g., JP 8-145061 A and JP 9-79265 A). Since the rigidity of the cage is increased, even when the bearing is used under high-temperature, high-speed conditions, the aforesaid deformations are less likely to be generated.

However, since the metallic reinforcement member is provided in the resin cage, the provision of the metallic reinforcement member constitutes a cause for an increase in the fabrication costs of such a ball bearing.

As shown in FIG. 46, a second conventional ball bearing has an inner ring 201 having an inner ring raceway surface 201a (a raceway groove) on an outer circumferential surface, an outer ring 202 having an outer ring raceway surface 202a (a raceway groove) on an inner circumferential surface, a plurality of balls 203 which are disposed rollably between the inner ring raceway surface 201a and the outer ring raceway surface 202a, and a resin crown type cage 204 which has an annular base portion 204a and pillar portions 204b provided on [an axial end face of] the base portion 204 so as to project therefrom and each having a claw portion at a distal end whereby the balls 203 are individually accommodated in spherical pockets 204c formed between the pillar portions 204b. The balls 203 are retained circumferentially at given intervals by the crown type cage 204 and revolve together with the cage 204.

When this type of ball bearing is used in a rotating portion such as a transmission of a motor vehicle, a forced feed lubrication system in which lubricating oil is supplied by a pump or the like is adopted in many cases. Lubricating oil flows through an interior of the bearing in an axial direction and circulates within the transmission unit for lubrication.

When this ball bearing is caused to rotate at high speeds, as shown in FIGS. 47A and 47B, the pillar portions 204b open radially outward about the base portion 204a of the crown type cage 204 as an axis of distortion. As a result, the contact surface pressure between a radially inner side of the spherical pocket 204c in the crown type cage 204 and the ball 203 is increased, whereby a radially inner portion 204p of the pocket 204c wears to be heated largely.

When the wear of the radially inner portion 204p of the pocket 204c progresses, the crown type cage 204 rotates with large run-out, and the crown type cage 204 vibrates. Further, as shown in FIG. 48, a radially outer side of the crown type cage 204 is brought into contact with the inner circumferential surface of the outer ring 202, and the pillar portion 204b wears, whereby in the worst case, there may be a situation in which the cage 204 fails.

On the other hand, as shown in FIGS. 49A and 49B, there is a proposal in which a center Oc of the spherical pocket 204c of the crown type cage 204 is disposed radially outer than a center T1 of a radial width of the crown type cage 204, that is, assuming that an overall radial width dimension of the crown type cage 204 is Q, an inner side width Q1 [than] *relative to* the center Oc of the spherical pocket 204c is made larger than an outer side width Q2 so as to ensure that a ball holding amount on the radially inner side becomes larger, thereby making it possible to suppress the radially outward warp of the crown type cage 204 (see, e.g., JP 5-34317 A).

However, in the ball bearing shown in FIGS. 49A and 49B, when the bearing is rotated at high speeds, a sufficient amount of lubricating oil is not supplied to the radially inner side of the spherical pocket 204c due to centrifugal force[, whereby]. *As such,* the radially inner side wears, [and finally, the] warp cannot be suppressed, [leading to a feat that the] *and a* problem is caused by the rotation of the crown type cage 204 with run-out.

In addition, it is considered that a lubricating oil nozzle is disposed close directly to an inner ring 201 side of the crown type cage 204 to supply the lubricating oil into an inner circumferential portion thereof. However, as this occurs, the lubrication nozzle is necessary *and* separately *added*, and a space where to install the lubrication nozzle is also necessary.

SUMMARY OF INVENTION

It is an object of the present invention to address one or more of the problems described above.

According to an aspect of the present invention, a ball bearing includes an inner ring having a raceway surface, an outer ring having a raceway surface, a plurality of rolling elements rollably disposed between the raceway surface of the inner ring and the raceway surfaces of the outer ring, and a resin cage configured to retain the plurality of rolling elements between the inner ring and the outer ring. The cage is a crown type cage having an annular base portion and a plurality of pockets formed in [an axial end face of] the annular base portion, in which the plurality of pockets retains the plurality of rolling elements. An axial distance between an axial position of a center of gravity of the cage and a curvature center of a spherical or cylindrical inner surface of each of the pockets is 0.6 or more times a radius of curvature of the inner surface.

According to another aspect of the present invention, a hybrid vehicle transmission includes the ball bearing described above.

Other aspects and advantages of the present invention will be apparent from the following description, drawings and the claims.

BRIEF DESCRIPTION OF THE DRAWINGS

[FIG. 1 is a partial sectional view of a ball bearing according to a first embodiment of the invention;]

[FIG. 2 is a perspective view of a cage of the ball bearing in FIG. 1;]

[FIG. 3 is a partial sectional view of the cage in FIG. 2;]

[FIG. 4 is a partial sectional view of the ball bearing showing a center of the cage in a radial thickness direction thereof;]

[FIG. 5 is a graph showing a relationship between an axial position of a center of gravity of the cage and moment acting on the cage;]

[FIG. 6 is an explanatory diagram showing an example of a radial gap between an inner ring and the cage of the ball bearing;]

[FIG. 7 is an explanatory diagram showing another example of a radial gap between the inner ring and the cage of the ball bearing.]

[FIG. 8 is an explanatory diagram showing an example of an axial distance between an axial end portion and the cage of the ball bearing;]

[FIG. 9 is an explanatory diagram showing another example of an axial distance between the axial end portion and the cage of the ball bearing;]

[FIG. 10 is a partial sectional view of a ball bearing according to a first modified example of the first embodiment;]

[FIG. 11 is a partial sectional view of a ball bearing according to a second modified example of the first embodiment;]

[FIG. 12 is a partial sectional view of a ball bearing according to a third modified example of the first embodiment;]

[FIG. 13 is a partial sectional view of a ball bearing according to a second embodiment of the invention;]

[FIG. 14 is a perspective view of a cage of the ball bearing in FIG. 13;]

[FIG. 15 is a partial sectional view of the cage in FIG. 14;]

[FIG. 16 is a partial sectional view of the ball bearing of the second embodiment showing a center of the cage in a radial thickness direction thereof;]

[FIG. 17 is an explanatory diagram showing an example of a radial gap between an inner ring and the cage of the ball bearing of the second embodiment;]

[FIG. 18 is an explanatory diagram showing another example of a radial gap between the inner ring and the cage of the ball bearing of the second embodiment.]

[FIG. 19 is an explanatory diagram showing an example of an axial distance between an axial end portion and the cage of the ball bearing of the second embodiment;]

[FIG. 20 is an explanatory diagram showing another example of an axial distance between the axial end portion and the cage of the ball bearing of the second embodiment;]

[FIG. 21 is a partial sectional view of a ball bearing according to a first modified example of the second embodiment;]

[FIG. 22 is a partial sectional view of a ball bearing according to a second modified example of the second embodiment;]

[FIG. 23 is a partial sectional view of a ball bearing according to a third modified example of the second embodiment;]

[FIG. 24 is an explanatory diagram of a configuration in which radially inner edge portions of a pocket of the cage are chamfered;]

[FIG. 25 is an explanatory diagram of a configuration in which the radially inner edge portions of the pocket of the cage are not chamfered;]

[FIG. 26 is an explanatory diagram of a configuration in which a center of the cage in a radial thickness direction thereof coincides with a center of a ball;]

[FIG. 27 is a graph showing a relationship between a chamfered amount and likelihood of fragment drop;]

[FIG. 28 is an explanatory diagram showing an angle θ formed by a straight line which connects a radially innermost contact point between the ball and the pocket with the center of the ball and a straight line which passes through the center of the ball and intersects the radial direction at right angles;]

[FIG. 29 is an explanatory diagram showing, in the configuration shown in FIG. 24, an angle θ formed by a straight line which connects a radially innermost contact point between the ball and the pocket with the center of the ball and a straight line which passes through the center of the ball and intersects the radial direction at right angles;]

[FIG. 30 is a graph showing a relationship between the angle θ and a radial shift amount of the cage;]

FIG. 31 is a sectional view of a ball bearing according to [a third] *an* embodiment of the invention;

FIG. 32 is a perspective view showing an example of a configuration of a crown type cage;

[FIG. 36A is a sectional view of a ball bearing according to a second modified example of the third embodiment of the invention;]

[FIG. 36B is a sectional view of a ball bearing according to a third modified example of the third embodiment of the invention;]

[FIG. 36C is a sectional view of a ball bearing according to a fourth modified example of the third embodiment of the invention;]

[FIG. 36D is a sectional view of a ball bearing according to a fifth modified example of the third embodiment of the invention;]

[FIG. 36E is a sectional view of a ball bearing according to a sixth modified example of the third embodiment of the invention;]

[FIG. 37A is a sectional view of a ball bearing according to a seventh modified example of the third embodiment of the invention;]

[FIG. 37B is a sectional view of a ball bearing according to an eighth modified example of the third embodiment of the invention;]

[FIG. 37C is a sectional view of a ball bearing according to a ninth modified example of the third embodiment of the invention;]

[FIG. 37D is a sectional view of a ball bearing according to a tenth modified example of the third embodiment of the invention;]

[FIG. 38 is a sectional view of a ball bearing that is used in Test 1 and Test 2;]

[FIG. 39 is a graph showing the results of Test 1;]

[FIG. 40 is a graph showing the results of Test 2;]

[FIG. 41 is a graph showing the results of Test 3;]

EMBODIMENTS OF INVENTION

Figure 33A:
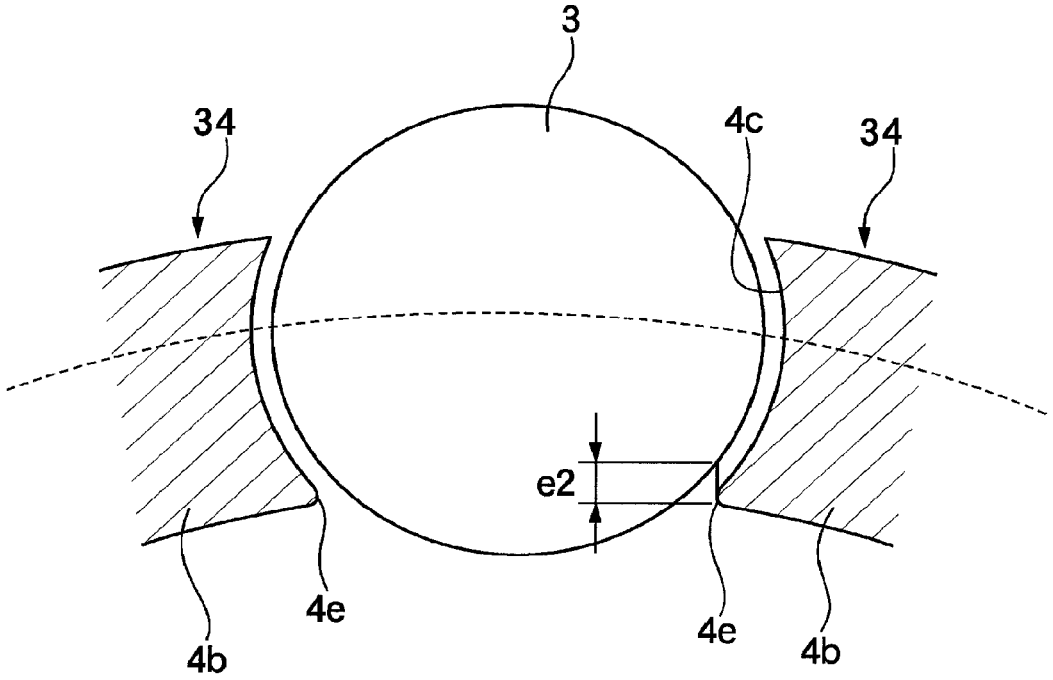
FIG. 33A is a diagram showing a configuration in which a radial widthwise center of the cage is radially inwardly offset from a center of a ball.

Hereinafter, embodiments of the invention will be described in detail by reference to the drawings.

[Embodiment 1]

[FIG. 1 is a partial sectional view of a ball bearing according to a first embodiment of the invention. FIG. 2 is a perspective view of a cage of the ball bearing in FIG. 1, and FIG. 3 is a partial sectional view of the cage in FIG. 2.]

[As shown in FIG. 1, a ball bearing of the first embodiment includes an inner ring 1, an outer ring 2, a plurality of balls 3 (rolling elements) disposed rollably between the inner ring 1 and the outer ring 2 and a resin cage 4 for retaining the plurality of balls 3 between the inner ring 1 and the outer ring 2. A lubricant (for example, lubricating oil or grease), not shown) is filled in a bearing space in which the balls 3 are disposed between the inner ring 1 and the outer ring 2, for initial lubrication, or a lubricant is supplied thereinto. Contact surfaces between raceway surfaces of the inner ring 1 and the outer ring 2 and the balls 3 are lubricated by the lubricant. ATF, which is one type of lubricating oil, is normally used as a lubricant.]

[While materials of the inner ring 1 and the outer ring 2 are not particularly limited, bearing steel such as SUJ2 steel is preferable, and in particular, a carburized or carbo-nitrided bearing steel is more preferable. It is possible to use a material produced by applying a carburizing treatment or a carbonitriding treatment to an alloy steel in which alloy elements such as silicon, manganese, chromium and molybdenum are added to a medium carbon steel. In particular, when a bearing is used under high-temperature, high-speed conditions, a material is preferable in which a carburizing treatment or a carbo-nitriding treatment is applied to one of such alloy steels which has a larger content of silicon.]

[The material of the balls 3 is not particularly limited. For example, the same bearing steel or alloy steel as the inner ring 1 and the outer ring 2, or ceramic can suitably be used.]

[Next, referring to FIGS. 2 and 3, the structure of the cage 4 will be described. The cage 4 is a crown type cage which is formed in one-piece by injection molding of resin material. The cage 4 includes an annular base portion 10 and a plurality of pockets 11 which are provided in an axial end face of the base portion 10 for retaining the balls 3 rollably. Each pocket 11 is formed by a recess portion 11a which is provided in the axial end face of the base portion 10 and a pair of elastic pieces 11b which are disposed at edges of the recess portion 11a so as to face each other with a space provided therebetween. Facing surfaces of the pair of elastic pieces 11b continue to an inner surface of the recess portion 11a so as to form a spherical recess surface or cylindrical surface.]

[Resin material forming the cage 4 is not particularly limited, provided that a resin material used has properties such as strength, heat resistance and the like which are necessary for the cage, synthetic resins such as nylon 46, nylon 66, polyphenylene sulfide (PPS), polytetra fluorine ethylene (PTFE) and polyether ether ketone (PEEK) are preferable. A resin composition which contains approximately 10 to 40 mass % of reinforcement material such as glass fibers (GF) or carbon fibers (CF) in a resin is particularly preferable, since such a resin composition exhibits high toughness and mechanical strength under high temperatures.]

[An axial distance A between an axial position of a center of gravity G of the cage 4 and a curvature center O11 of the spherical or cylindrical inner surface of the pocket 11 is 0.6 to 0.9 times a radius of curvature r of the inner surface of the pocket 11. With this configuration, even when the ball bearing is used at high temperatures (100° C. or higher) and at high speeds (rotation speeds of 10000 $min^{-1}$ or higher, 0.6 million or larger in dmn value or 1 million or larger in dmn value), the cage 4 is not likely to be deformed. Consequently, the ball bearing having the cage 4 can be used preferably under high-temperature, high-speed conditions and is preferable as a bearing which rotatably support a rotating shaft of a drive motor or a generator (for example, an alternator) of a hybrid vehicle, for example. In addition, since the cage 4 includes no metallic reinforcement member, the ball bearing can be fabricated inexpensively.]

[Referring to FIG. 3, a range of the axial distance A between the axial position of the center of gravity G of the cage 4 and the curvature center O11 of the inner surface of the pocket 11 will be described in greater detail. When the ball bearing is used under high-temperature, high-speed conditions whereby a large centrifugal force is exerted on the cage 4, the elastic pieces 11b of the pocket 11 are deformed radially outwards. This is because since the elastic pieces 11b are constructed in a cantilever-like fashion, the centrifugal force is exerted on the axial position of the center of gravity G of the cage 4 as moment with a rigidity center S of the cage 4 acting as a fulcrum. The rigidity center S is situated in a substantially intermediate position between the other end face of the base portion 10 (an end face of axial end faces of the base portion 10 in which no pocket is formed) and a bottom portion of the pocket 11.]

Figure 45:
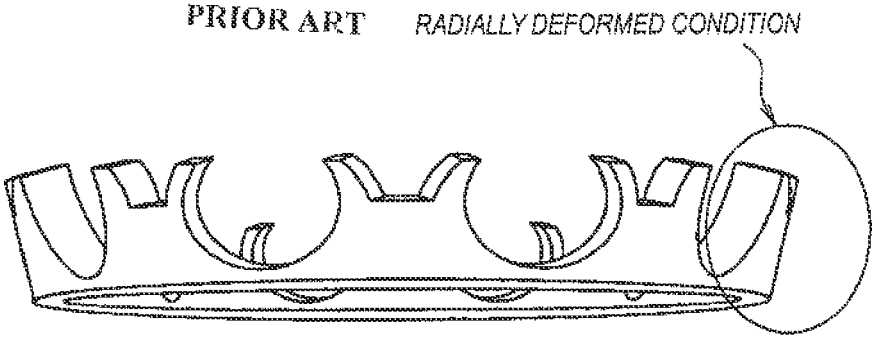
FIG. 45 PRIOR ART
FIG. 45 is a side view of the cage showing an elastic piece which is deformed radially outwards.
Figure 46:
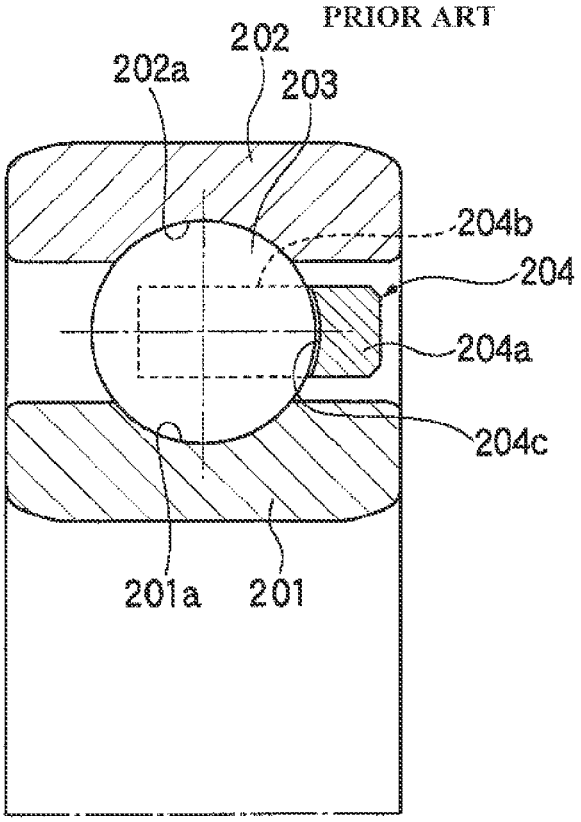
FIG. 46 PRIOR ART
FIG. 46 is a partial sectional view of a ball bearing according to a second conventional example.
Figure 47A:
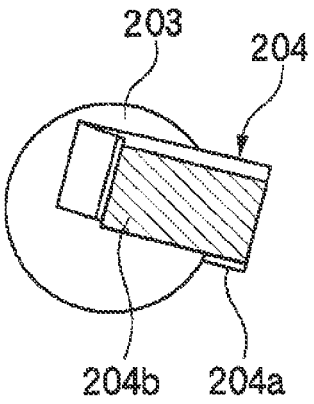
FIG. 47A PRIOR ART
FIG. 47A is an axially sectional view of a cage of the second conventional example.
Figure 47B:
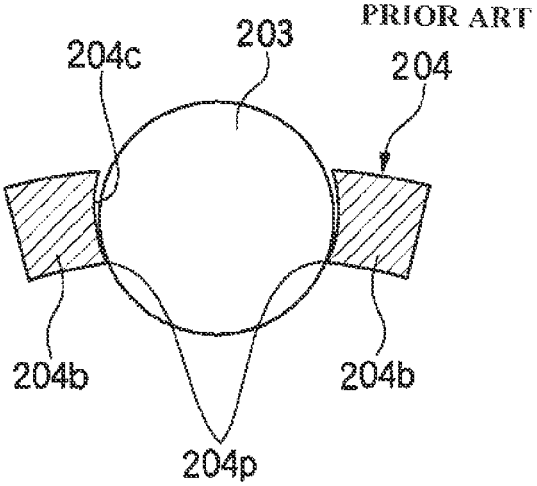
FIG. 47B PRIOR ART
FIG. 47B is a circumferentially sectional view of the cage of the second conventional example.
Figure 48:
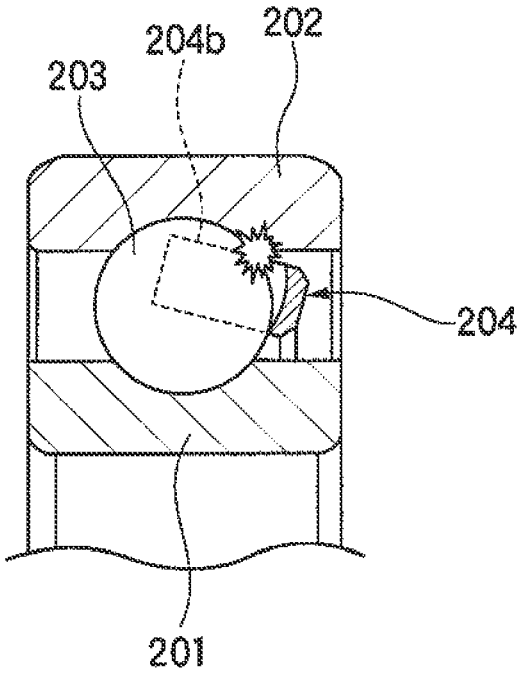
FIG. 48 PRIOR ART
FIG. 48 is a diagram explaining a problematic point when the cage of the second conventional example wears.
Figure 49A:
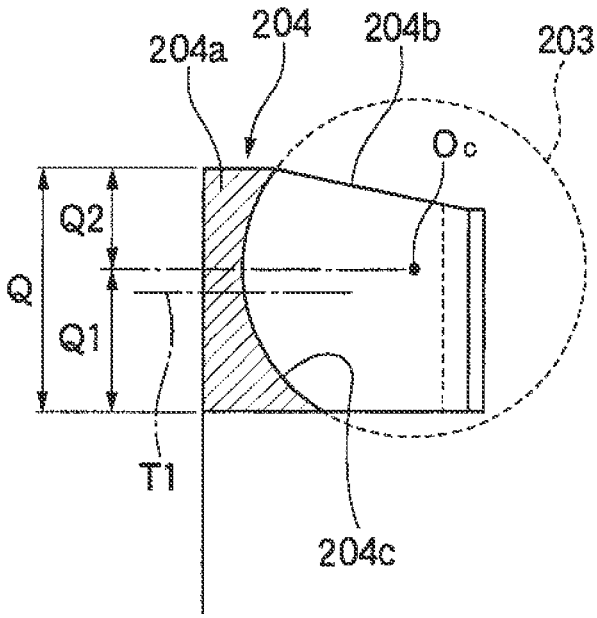
FIG. 49A PRIOR ART
FIG. 49A is a partial sectional view of the cage of the second conventional example.
Figure 49B:
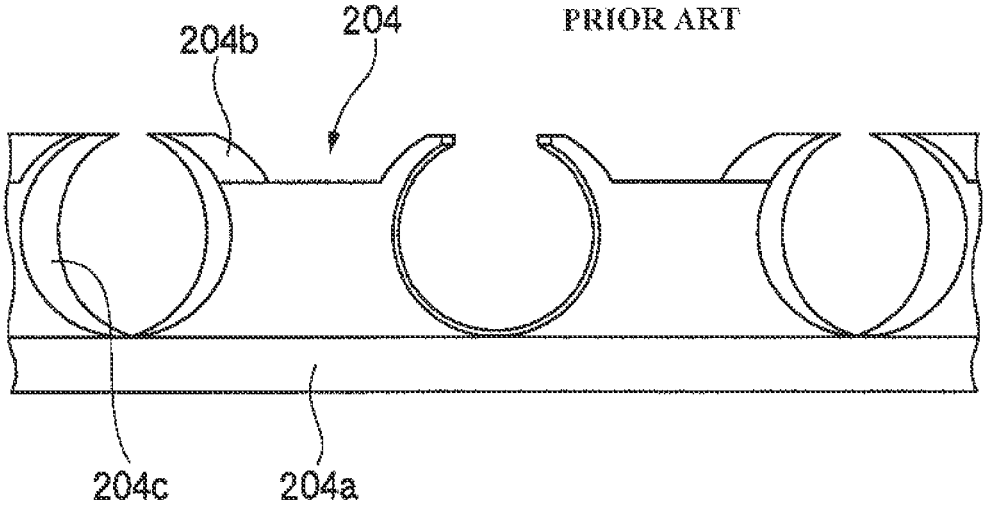
FIG. 49B PRIOR ART
FIG. 49B is a partial sectional view of the cage of the second conventional example.

[Consequently, in case the axial position of the center of gravity G of the cage 4 is positioned near the rigidity center S, even when a large centrifugal force is exerted on the cage 4, since the moment becomes small, warping of the base portion 10 can be suppressed which would otherwise be generated by the radially outward deformation of the elastic pieces 11b of the pocket 11. Namely, the generation of a large deformation as shown in FIG. 45 in the cage can be suppressed.]

[Assuming that the axial distance A between the axial position of the center of gravity G of the cage 4 and the curvature center O11 of the inner surface of the pocket 11 is 0.6 to 0.9 times the radius of curvature r of the inner surface of the pocket 11, since the axial position of the center of gravity G of the cage 4 and the rigidity center S are positioned near to each other, even when the centrifugal force is exerted on the cage 4, the radially outward deformation of the elastic pieces 11b is suppressed. As a length between the other axial end face of the base portion 10 and the bottom portion of the pocket 11, that is, the thickness B of the base portion 10 increases, the axial position of the center of gravity G of the cage 4 shifts to the direction of the other axial end face of the base portion 10, and the axial distance A becomes large. Namely, the axial position of the center of gravity G of the cage 4 approaches the rigidity center S.]

[When the axial distance A is less than 0.6 times the radius of curvature r, the moment exerted on the axial position of the center of gravity G of the cage becomes large, causing a fear that the cage 4 is deformed. On the other hand, when the axial distance A is more than 0.9 times the radius of curvature r, the width (the axial length) of the cage 4 is increased, and when the ball bearing has seal members, there is caused a fear that the cage 4 is brought into contact with the seal member. In addition, even when the ball bearing has no seal members, there is caused a fear that the cage 4 projects outwards from a side of the ball bearing. In order to make it more difficult for these drawbacks to occur, the axial distance A is preferably 0.65 to 0.85 times the radius of curvature r, and is more preferably 0.75 to 0.85 times the radius of curvature r.]

[Further, as shown in FIG. 4, the cage 4 is configured such that the center in the radial thickness thereof is positioned radially inwards than the center of the ball 3. By having such a construction, the rigidity of the cage 4 is increased, whereby the deformation of the cage 4 by centrifugal force is suppressed.]

[A magnitude of moment based on a centrifugal force that would be exerted on the cage when the ball bearing is rotated is calculated. The results of calculations are shown in FIG. 5. In this graph, an axis of ordinates denotes a magnitude of moment exerted on the cage, while an axis of abscissae denotes a ratio of the axial distance between the axial position of the center of gravity of the cage and the curvature center of the inner surface of the pocket to the radius of curvature of the inner surface of the pocket (in the graph, described as the axial position of the center of gravity of the cage). From this graph, the axial distance A is preferably 0.6 or more times, is more preferably 0.65 or more times and is most preferably 0.75 or more times the radius of curvature of the inner surface of the pocket. In particular, as the dmn value increases to 1.13 million and further to 1.7 million, the effect of suppressing the moment becomes more remarkable.]

[As described above, the cage 4 is configured such that the center in the radial thickness direction thereof is positioned radially inwards than the center of the ball 3. In addition, as the diameter of the center of the cage 4 in the radial thickness direction thereof becomes smaller, the deformation of the cage 4 is less likely to occur.]

[However, when the diameter of the center of the cage 4 in the radial thickness direction thereof is too small, following problem may occur.]

[When hybrid vehicles are used in cold regions, there may be a situation in which the temperature of a ball bearing for supporting rotatably a rotating shaft of a drive motor or a generator (e.g., an alternator) of a hybrid vehicle is decreased to a temperature as low as approximately −40° C. When the temperature is so decreased, the resin cage 4 is easier to shrink than the metallic inner ring 1, and therefore, a difference between an inside diameter of the cage 4 and an outside diameter of the inner ring 1 (hereinafter, referred to as a radial gap) becomes zero, causing a fear that the bearing is locked so as not to rotate.]

[Consequently, the radial gap at a normal temperature is preferably set so that even when the temperature of the bearing is changed from the normal temperature to −40° C. to thereby cause the cage 4 and the inner ring 1 to shrink, the radial gap does not become zero. Namely, the radial gap at the normal temperature is preferably larger than an amount shrinkage of the inside diameter of the cage 4 caused when the temperature of the cage 4 changes from the normal temperature to −40° C. to shrink the cage 4.]

[The shrinking amount of the inside diameter of the cage 4 can be obtained as a product of the inside diameter of the cage 4, the linear expansion coefficient of the material of the cage 4 and a temperature variation. The temperature variation is a difference between the normal temperature and −40° C. and, for example, and when the normal temperature is 20° C., the temperature variation is 60° C.]

[In addition, since the radius of curvature r of the inner surface of the pocket 11 of the cage 4 is slightly larger than a radius of the ball 3, the cage 4 may play in the radial direction. In case this play amount is too large, the inner circumferential surface of the cage 4 and the outer circumferential surface of the inner ring 1 are brought into contact with each other, causing a fear that the torque of the bearing is increased.]

[Consequently, the radial gap is preferably larger than the radial play amount of the cage 4 so that even when the cage 4 radially plays, the inner circumferential surface of the cage 4 is not brought into contact with the outer circumferential surface of the inner ring 1. The radial play amount of the cage 4 means a sum of a maximum distance along which the cage can shift in one of radial directions and a maximum distance along which the cage can shift in a 180°-degree opposite direction to the one radial direction.]

[The ball bearing for supporting rotatably the rotating shaft of the drive motor or the generator (for example, the alternator) of the hybrid vehicle is lubricated by lubricating oil in many cases. When the ball bearing rotates at high speeds, lubricating oil introduced into an interior of the bearing from an opening in an axial end portion of the bearing flows radially outwards due to centrifugal force. Therefore, it is difficult for the lubricating oil to enter between the inner circumferential surface of the cage 4 and the outer circumferential surface of the inner ring 1, and an insufficient lubrication tends to occur easily (see FIG. 7). As a result, there is caused a fear that wear, heat-seizure and skidding occur in the cage 4.]

[Consequently, the radial gap is preferably 0.15 or more times, and is more preferably 0.2 or more times the diameter of the ball. By having such radial gaps, as shown in FIG. 6, the lubricating oil can easily enter between the inner circumferential surface of the cage 4 and the outer circumferential surface of the inner ring 1, and hence, the insufficient lubrication is made difficult to occur. When generally taking these into consideration, the radial gap is preferably 2% to 10%, and is more preferably 2% to 7% of the outside diameter dimension of the inner ring 1 at 20° C.]

[As axial end portions of the bearing, there are an end portion which faces the axial end face of the base portion 10 of the cage 4 where the pockets 11 are formed and an end portion which faces the other axial end face of the base portion 10 of the cage 4 where no pockets 11 are formed. In FIGS. 6 and 7, examples are shown in which the lubricating oil is introduced into the interior of the bearing from an opening in the latter end portion. However, an advantage similar to the advantage described above can also be obtained even when the lubricating oil is introduced into the interior of the bearing from an opening in the opposite end portion, that is, from an opening in the former end portion.]

[With a construction shown in FIG. 9, even when the radial gap is ensured sufficiently as is described above, most of the lubricating oil is caused to flow radially outwards by centrifugal force before the lubricating oil reaches the gap defined between the inner circumferential surface of the cage 4 and the outer circumferential surface of the inner ring 1, and therefore, there may be a fear that an insufficient lubrication occurs. Namely, as shown in FIG. 9, when an axial length L of a space is large which is defined between the axial end portion of the bearing and the axial end face of the base portion 10 of the cage 4 where no pockets 11 are formed, there may be a fear that an insufficient lubrication occurs.]

[Consequently, it is preferable that the axial end face of the base portion 10 of the cage 4 where no pockets 11 are formed is placed close to the axial end portion of the bearing. Specifically, when the axial length L is 0.15 or less times the diameter of the ball 3, as shown in FIG. 8, the lubricating oil is allowed to enter easily between the inner circumferential surface of the cage 4 and the outer circumferential surface of the inner ring 1, whereby a good lubrication is obtained. More specifically, the axial length L is preferably 5 mm or smaller and is more preferably 2 mm or smaller. However, it is preferable that the cage 4 does not project from an end face of the inner ring 1 or the outer ring 2. To make this happen, the axial length L is most preferably 0.1 mm or larger and 2 mm or smaller, including a shift amount of the cage 4 due to gaps between the pockets 11 and the balls 3.]

[FIG. 10 shows a first modified example of the first embodiment. As shown in FIG. 10, in order to deal with the problem of insufficient lubrication, a lubricant guide 25 may be provided near an axial end portion of a bearing for guiding a lubricant from an opening in an axial end portion into an interior of the bearing. Then, the lubricating oil is allowed to enter easily between a inner circumferential surface of a cage 4 and an outer circumferential surface of an inner ring 1, whereby an insufficient lubrication is made difficult to occur. In the example shown in FIG. 10, a plate-shaped lubricant guide 25 is attached to an axial end face of the bearing, and the lubricating oil supplied from the center of a shaft is returned by the lubricant guide 25 in a direction directed towards the interior of the bearing, whereby the lubricating oil is introduced into the interior of the bearing from the opening in the axial end portion of the bearing.]

[In addition, a member having the same construction as that of the lubricant guide 25 may be provided near the opposite axial end portion to the axial end portion where the lubricant guide 25 is provided (that is, the axial end portion of which the lubricant flows out). The same advantage can also be obtained even when the guide members are provided at both the axial end portions in the way described above. In addition, this lubricant guide 25 can also be made up of a general shield plate or a seal. As this occurs, the lubricant tends to be introduced easily from a gap between an inner circumferential surface of the shield plate or the seal and the outer circumferential surface of the inner ring 1. A seal member such as the seal or the seal plate may be provided at both the axial ends or may be provided only one of the axial ends.]

[FIG. 11 shows a second modified example of the first embodiment. In a ball bearing shown in FIG. 11, lubricating oil is introduced into an interior of the bearing from an opening in an axial end portion of the bearing (an end portion which faces an axial end face of a base portion 10 of a cage 4 where no pockets 11 are formed) and is then discharged to the outside from an opening in the other axial end portion (an end portion which faces an axial end face of the base portion 10 of the cage 4 where pockets 11 are formed). An inside diameter as a shoulder portion of an outer ring 2 is larger on a lubricant discharge side than on a lubricant introducing side. According to this configuration, since the lubricant becomes easy to be taken into the interior of the bearing from the opening in the axial end portion on the lubricant introducing side of the bearing, the amount of lubricant which passes through the interior of the bearing is increased.]

[As in a third modified example of the first embodiment shown in FIG. 12, also when an outside diameter at a shoulder portion of an inner ring 1 is larger on a lubricant discharge side than on a lubricant introducing side, the same advantage as that described above can be obtained. Both the outside diameter of the inner ring 1 at the shoulder portion and the inside diameter of the outer ring 2 at the shoulder portion may be larger on the lubricant discharge side than the lubricant introducing side.]

[Further, in FIGS. 11 and 12, although the examples are shown in which the lubricant is introduced into the interior of the bearing from the opening in the end portion on a side toward which the axial end face of the base portion 10 of the cage 4 where no pockets 11 are formed faces, the same advantage as that described above can also be obtained when the lubricant is introduced into the interior of the bearing portion from the opening in the opposite end portion, that is, the opening in the end portion on a side toward which the other axial end face of the base portion 10 of the cage 4 where the pockets 11 are formed faces.]

[Embodiment 2]

[FIG. 13 is a partial sectional view of a ball bearing according to a second embodiment of the invention. FIG. 14 is a perspective view of a cage of the ball bearing in FIG. 13, and FIG. 15 is a partial sectional view of the cage in FIG. 14. In the description of the second embodiment, the same reference numerals as those in the first embodiment will be given to the same or like portions to those of the first embodiment. In addition, detailed descriptions of similar configurations to those of the first embodiment will be omitted.]

[A ball bearing in FIG. 13 includes an inner ring 21, an outer ring 22, a plurality of balls 3 (rolling elements) disposed rollably between the inner ring 21 and the outer ring 22 and a resin cage 24 for retaining the plurality of balls 3 between the inner ring 21 and the outer ring 22. A raceway surface 21a (a raceway groove) of the inner ring 21 and a raceway surface 22a (a raceway groove) of the outer ring 22 are disposed in a position which is offset towards one side (a right-hand side in FIG. 13) in the axial direction from axially widthwise centers of the inner ring 21 and the outer ring 22. Note that an offset amount is not specifically limited. However, it is preferable that the balls 3 do not project from an axial end face of at least one of the inner ring 21 and the outer ring 22, even including an axial gap of the ball bearing.]

[A lubricant (for example, lubricating oil or grease), not shown) is filled in a bearing space in which the balls 3 are disposed between the inner ring 21 and the outer ring 22 or a lubricant is supplied thereinto. Contact surfaces between the raceway surfaces of the inner ring 21 and the outer ring 22 and the balls 3 are lubricated by this lubricant.]

[While materials of the inner ring 21 and the outer ring 22 are not particularly limited, bearing steel such as SUJ2 steel is preferable, and in particular, a carburized or carbo-nitrided bearing steel is more preferable. In addition, it is possible to use a material produced by applying a carburizing treatment or a carbo-nitriding treatment to an alloy steel in which alloy elements such as silicon, manganese, chromium and molybdenum are added as required to a medium carbon steel. In particular, when a bearing is used under high-temperature, high-speed conditions, a material is preferable in which a carburizing treatment or a carbo-nitriding treatment is applied to one of such alloy steels which has a larger content of silicon.]

[Material of the balls 3 is not particularly limited. For example, bearing steels or ceramics can suitably be used.]

[Next, referring to FIGS. 14 and 15, the construction of the cage 24 will be described. The cage 24 is a crown type cage which is formed in one-piece by injection molding of resin material. The cage 24 includes an annular base portion 20 and a plurality of pockets 11 which are provided in an axial end face of the base portion 20 for rollably retaining the balls 3.]

[Each pocket 11 is formed by a recess portion 11a which is provided in the axial end face of the base portion 20 and a pair of elastic pieces 11b which are disposed at edges of the recess portion 11a so as to face each other with a space provided therebetween. Facing surfaces of the pair of elastic pieces 11b continue to an inner surface of the recess portion 11a so as to form a spherical recess surface or cylindrical surface.]

[The cage 24 is disposed so that the pockets 11 face the side to which the raceway surfaces 21a, 22a are offset, that is, to the right-hand side of FIG. 13, while the base portion 20 faces an opposite side to the side to which the raceway surfaces are offset (hereinafter, referred to as an opposite side to the raceway surfaces offset side).]

[Since the raceway surfaces 21a, 22a are disposed in the position which is offset toward one side in the axial direction from the axially widthwise centers of the inner ring 21 and the outer ring 22, a larger space is formed on the opposite side to the raceway surfaces offset side (a left-hand side in FIG. 13) in an interior of the bearing than on the raceway surfaces offset side. Because of this, when the ball bearing has seal members, the base portion 20 of the cage 24 is made difficult to be brought into contact with the seal member. In addition, the base portion 20 of the cage 24 is made difficult to project to the outside from an opening in the axial end portion of the bearing. Further, compared with a case where the raceway surfaces 21a, 22a are disposed in the axially widthwise centers of the inner ring 21 and the outer ring 22, the base portion 20 of the cage 24 can be given an axially elongated shape (see FIG. 13). With such a shape given to the base portion 20, the rigidity of the cage 24 can be increased so as to make it difficult for the cage 24 to be deformed.]

[Resin material forming the cage 24 is not particularly limited, provided that a resin material used has properties such as strength, heat resistance and the like which are necessary for the cage, synthetic resins such as nylon 46, nylon 66, polyphenylene sulfide (PPS), polytetra fluorine ethylene (PTFE) and polyether ether ketone (PEEK) are preferable. In addition, a resin composition which contains approximately 10 to 40 mass % of reinforcement material such as glass fibers (GF) or carbon fibers (CF) in a resin is particularly preferable, since such a resin composition exhibits high toughness and mechanical strength under high temperatures.]

[An axial distance A between an axial position of a center of gravity G of the cage 24 and a curvature center O11 of the spherical or cylindrical inner surface of the pocket 11 is 0.6 to 1.2 times a radius of curvature r of the inner surface of the pocket 11. With this configuration, even when the ball bearing is used at high temperatures (100° C. or higher) and at high speeds (rotation speeds of 10000 $min^{-1}$ or higher, 0.6 million or larger in dmn value or 1 million or larger in dmn value), the cage 24 is not likely to be deformed. A remarkable effect can be obtained, in particular, under a high speed condition in which the dmn value is 1.1 million or more and under an ultra-high speed condition in which the dmn value is 1.5 million or more. Consequently, the ball bearing can be used preferably under high-temperature, high-speed conditions and is preferable as a bearing which rotatably support a rotating shaft of a drive motor or a generator (for example, an alternator) of a hybrid vehicle, for example. In addition, since the cage 24 includes no metallic reinforcement member, the ball bearing can be fabricated inexpensively.]

[Referring to FIG. 15, a range of the axial distance A between the axial position of the center of gravity G of the cage 24 and the curvature center O11 of the inner surface of the pocket 11 will be described in greater detail. When the ball bearing is used under high-temperature, high-speed conditions whereby a large centrifugal force is exerted on the cage 24, the elastic pieces 11b of the pocket 11 are deformed radially outwards. This is because since the elastic pieces 11b are constructed in a cantilever-like fashion, the centrifugal force is exerted on the axial position of the center of gravity G of the cage 4 as moment with a rigidity center S of the cage 24 acting as a fulcrum. The rigidity center S is situated in a substantially intermediate position between the other end face of the base portion 20 (an end face of axial end faces of the base portion 20 in which no pockets are formed) and a bottom portion of the pocket 11.]

[Consequently, in case the axial position of the center of gravity G of the cage 24 is positioned near the rigidity center S, even when a large centrifugal force is exerted on the cage 24, since the moment becomes small, warping of the base portion 20 can be suppressed which would otherwise be generated by the radially outward deformation of the elastic pieces 11b of the pocket 11. Namely, the generation of a large deformation as shown in FIG. 45 in the cage can be suppressed.]

[Assuming that the axial distance A between the axial position of the center of gravity G of the cage 24 and the curvature center O11 of the inner surface of the pocket 11 is 0.6 to 1.2 times the radius of curvature r of the inner surface of the pocket 11, since the axial position of the center of gravity G of the cage 24 and the rigidity center S are positioned near to each other, even when the centrifugal force is exerted on the cage 24, the radially outward deformation of the elastic pieces 11b is suppressed. As a length between the other axial end face of the base portion 20 and the bottom portion of the pocket 11, that is, the thickness B of the base portion 20 increases, the axial position of the center of gravity G of the cage 24 shifts to the direction of the other axial end face of the base portion 20, and the axial distance A becomes large. Namely, the axial position of the center of gravity G of the cage 24 approaches the rigidity center S. In addition, since the raceway surfaces 21a, 22a are offset, it is possible to ensure a large distance for the axial distance A.]

[When the axial distance A is less than 0.6 times the radius of curvature r, the moment exerted on the axial position of the center of gravity G of the cage 24 becomes large, causing a fear that the cage 24 is deformed. On the other hand, when the axial distance A is more than 1.2 times the radius of curvature r, the width (the axial length) of the cage 24 is increased, and when the ball bearing has seal members, there is caused a fear that the cage 24 is brought into contact with the seal member. In addition, even when the ball bearing has no seal members, there is caused a fear that the cage 24 projects outwards from a side of the ball bearing. In order to make it more difficult for these drawbacks to occur, the axial distance A is preferably 0.65 to 1.1 times, more preferably 0.75 to 1.1 times, and is much more preferably 0.85 to 1.1 times the radius of curvature r, and in an operating condition in which the dmn value exceeds 1 million, the axial distance A is most preferably 0.9 to 1.1 times the radius of curvature r.]

[A magnitude of moment based on a centrifugal force that would be exerted on the cage when the ball bearing of the second embodiment is rotated is calculated. The results of calculations are the same as those indicated on the graph in FIG. 5 which shows the results of the calculations made in the first embodiment. Namely, as shown in the graph in FIG. 5, the axial distance A is preferably 0.6 or more times, and is more preferably 0.65 or more times the radius of curvature of the pocket. In particular, as the dmn value increases to 1.13 and 1.7 million, the effect of suppressing the moment becomes more remarkable.]

[As shown in FIG. 16, the cage 24 may be configured such that the center in the radial thickness direction thereof is positioned radially inwards than the center of the ball 3. Since the rigidity of the cage 24 is increased by being so constructed, the deformation of the cage 24 is suppressed.]

[In addition, as with the first embodiment, a difference between an inside diameter of the cage 24 and an outside diameter of the inner ring 21 (hereinafter, referred to as a radial gap) at the normal temperature may be made larger than the shrinking amount of the inside diameter of the cage 24 when the cage 24 shrinks as a result of the temperature of the bearing changing from the normal temperature down to −40° C. According to this configuration, even when the cage 24 and the inner ring 21 shrink as a result of the temperature of the bearing changing from the normal temperature down to −40° C., the radial gap does not become zero, whereby the bearing can be prevented from being made not to rotate as a result of being locked.]

[In addition, as with the first embodiment, the radial gap may be made larger than a play amount of the cage 24. According to this configuration, even when the cage 24 radially plays, an inner circumferential surface of the cage 24 can be prevented from being brought into contact with the outer circumferential surface of the inner ring 21.]

[In addition, as with the first embodiment, the radial gap may be 0.15 or more times, and is more preferably 0.2 or more times the diameter of the ball 3. By having such radial gaps, the lubricating oil can easily enter between the inner circumferential surface of the cage 24 and the outer circumferential surface of the inner ring 21, and hence, the insufficient lubrication is made difficult to occur (see FIGS. 17 and 18). Consequently, as with the first embodiment, the radial gap is preferably 2% to 10%, and is more preferably 2% to 7% of the outside diameter dimension of the inner ring 21 at 20° C.]

[The axial end portion of the bearing may be an end portion on a side toward which the axial end face of the base portion 20 of the cage 24 where the pockets 11 are formed faces or an end portion on the other side toward which the other axial end face of the base portion 20 of the cage 24 where no pockets 11 are formed faces. In FIGS. 17, 18, examples are shown in which the lubricating oil is introduced into the interior of the bearing from an opening in the latter end portion. However, an advantage similar to the advantage described above can also be obtained even when the lubricating oil is introduced into the interior of the bearing from an opening in the opposite end portion, that is, from an opening in the former end portion.]

[With a construction shown in FIG. 20, even when the radial gap is ensured sufficiently as is described above, most of the lubricating oil is caused to flow radially outwards by centrifugal force before the lubricating oil reaches the gap defined between the inner circumferential surface of the cage 24 and the outer circumferential surface of the inner ring 21, and therefore, there may be a fear that an insufficient lubrication occurs. Namely, as shown in FIG. 20, when an axial length L of a space is large which is defined between the axial end portion of the bearing and the axial end face of the base portion 20 of the cage 24 where no pockets 11 are formed, there may be a fear that an insufficient lubrication occurs.]

[Consequently, it is preferable that the axial end face of the base portion 20 of the cage 24 where no pockets 11 are formed is placed close to the axial end portion of the bearing. Specifically, as with the first embodiment, when the axial length L is 0.15 or less times the diameter of the ball 3, as shown in FIG. 19, the lubricating oil is allowed to enter easily between the inner circumferential surface of the cage 24 and the outer circumferential surface of the inner ring 21, whereby a good lubrication is obtained. More specifically, the axial length L is preferably 5 mm or smaller, and is more preferably 2 mm or smaller. However, it is preferable that the cage 24 does not project from an end face of the inner ring 21 or the outer ring 22. To make this happen, the axial length L is most preferably 0.1 mm or larger and 2 mm or smaller, including a shift amount of the cage 24 due to gaps between the pockets 11 and balls 3.]

[FIG. 21 shows a first modified example of the second embodiment. According to the first modified example of the second embodiment, as with the first modified example of the first embodiment, a lubricant guide 25 is provided near an axial end portion of a bearing for guiding a lubricant from an opening in the axial end portion into an interior of the bearing. Consequently, the lubricating oil is allowed to enter easily between a inner circumferential surface of a cage 24 and an outer circumferential surface of an inner ring 21, whereby an insufficient lubrication is made difficult to occur. In the example shown in FIG. 21, a plate-shaped lubricant guide 25 is attached to an axial end face of the bearing, and the lubricating oil supplied from the center of a shaft is returned by the lubricant guide 25 in a direction directed towards the interior of the bearing, whereby the lubricating oil is introduced into the interior of the bearing from the opening in the axial end portion of the bearing.]

[In addition, a member having the same construction as that of the lubricant guide 25 may be provided near the opposite axial end portion to the axial end portion where the lubricant guide 25 is provided (that is, the axial end portion of which the lubricant flows out). The same advantage can also be obtained even when the guide members are provided at both the axial end portions in the way described above. In addition, this lubricant guide 25 can also be made up of a general shield plate or a seal. As this occurs, the lubricant tends to be introduced easily from a gap between an inner circumferential surface of the shield plate or the seal and the outer circumferential surface of the inner ring 21. A seal member such as the seal or the seal plate may be provided at both the axial ends or may be provided only one of the axial ends.]

[FIG. 22 shows a second modified example of the second embodiment. In a ball bearing shown in FIG. 22, lubricating oil is introduced into an interior of the bearing from an opening in an axial end portion of the bearing (an end portion on a side toward which an axial end face of a base portion 20 of a cage 24 where no pockets 11 are formed faces) and is then discharged to the outside from an opening in the other axial end portion (an end portion on the other side toward which the other axial end face of the base portion 20 of the cage 24 where pockets 11 are formed faces). According to the second modified example of the second embodiment, as with the second modified example of the first embodiment, an inside diameter at a shoulder portion of an outer ring 22 is larger on a lubricant discharge side than on a lubricant introducing side. Consequently, the lubricant becomes easy to be taken into the interior of the bearing from the opening in the axial end portion on the lubricant introducing side of the bearing, whereby the amount of lubricant which passes through the interior of the bearing is increased.]

[As in a third modified example of the second embodiment shown in FIG. 23, also when an outside diameter at a shoulder portion of an inner ring 21 is larger on a lubricant discharge side than on a lubricant introducing side, the same advantage as that described above can be obtained. Both the outside diameter of the inner ring 21 at the shoulder portion and the inside diameter of the outer ring 22 at the shoulder portion may be larger on the lubricant discharge side than the lubricant introducing side.]

[Further, in FIGS. 22 and 23, although the examples are shown in which the lubricant is introduced into the interior of the bearing from the opening in the end portion of the bearing on a side toward which the axial end face of the base portion 20 of the cage 24 where no pockets 11 are formed faces, the same advantage as that described above can also be obtained when the lubricant is introduced into the interior of the bearing portion from the opening in the opposite end portion, that is, from the opening in the other end portion on the other side toward which the other axial end face of the base portion 20 of the cage 24 where the pockets 11 are formed faces.]

[As in the first embodiment and the second embodiment, the center of the cage 4, 24 in the radial thickness direction thereof is positioned radially inwards than the center of the ball 3, as shown in FIG. 25, edge portions (in particular, radially inward edge portions) of the inner surface of the pocket 11 tend to have a sharp shape (a sharp edge), and when the ball 3 collides thereagainst, there is caused a fear that the sharp edge portions are damaged, causing fragments to drop.]

[When the fragments that have dropped are caught between the inner ring 1, 21 and the ball 3 and/or between the outer ring 2, 22 and the ball 3, depressions are caused in the inner ring 1, 21 and/or the outer ring 2, 22 and the ball 3, whereby the life of the bearing is shortened. In addition, when the amount of fragments that drop is large, the gaps between the inner surface of the pocket 11 and the ball 3 become large, whereby there is caused a fear that harmful vibration and noise are caused in the bearing.]

[In order to deal with these problems, as shown in FIG. 24, the edge portions (in particular, the radially inward edge portions) are preferably chamfered to form substantially flat chamfered portions 11c. When the edge portions are chamfered, since the sharp edges are eliminated, there is caused almost no fear that fragments drop. In addition, the lubricating oil is allowed to be easily taken into the interior of the pocket 11 in the cage 4. Consequently, in particular, in a bearing that is lubricated by lubricating oil, there is provided an advantage that the lubrication performance of the bearing is increased by the formation of the chamfered portions 11c.]

[When the cage is configured such that the center in the radial thickness direction thereof coincides with the center of the ball (see FIG. 26), when chamfering is applied in the way described above, the shift amount of the cage in the radial direction is increased, whereby vibration and noise which are harmful to the bearing tend to be generated easily.]

[Here, the results of an evaluation will be described which are made on likelihood of fragment drops which are caused as a result of the sharp edge portions being damaged.]

[On bearings in which a center of a cage in a radial thickness direction thereof is positioned radially inwards than the center of the ball, likelihood of fragment drop by rotation was surveyed by changing variously the amount of chamfering. Namely, likelihood of fragment drop by rotation was surveyed on bearings in which values resulting when a radial distance between the center of the cage in the radial thickness direction thereof and the center of the ball is divided by the radius of curvature of the inner surface of the pocket (hereinafter, referred to as an offset amount of the center position of the cage) are 0%, 4.3% and 12.9%. The results are shown in FIG. 27.]

[The chamfering amount is a value (in %) obtained by dividing a radial length M of the chamfered portion 11c by the radius of curvature of the inner surface of the pocket 11 (see FIG. 24). In addition, the likelihood of fragment drop means a value of stress exerted on the edge portions of the inner surface of the pocket by the contact with the ball and is indicated by a relative value based on the value of stress of the bearing in which the offset amount of the center position of the cage is 0% and the chamfering amount is 0%.]

[It is seen from a graph in FIG. 27 that the offset amount of the center position of the cage becomes larger, fragments are made more difficult to drop. In addition, in the event that the edge portions are chamfered even a little, it is effective in preventing the drop of fragments, and it is seen that with a chamfering amount of 2.5% or more, fragment are made sufficiently difficult to drop. However, when the chamfering amount exceeds 5%, on the contrary, there may be a situation in which fragments are made easy to drop. Consequently, the chamfering amount is preferably 0.5% to 5%, and is more preferably 2.5% to 4.5%.]

[When the inside diameter of the cage 4, 24 becomes too large for the reason that the radial thickness of the cage 4, 24 is thin, the radial shift amount (the play amount) of the cage 4, 24 is increased, whereby vibration and noise harmful to the bearing tend to be caused easily. Consequently, the inside diameter of the cage 4, 24 is preferably set to a suitable value.]

[Then, an imaginary straight line L1 is drawn which connects a radially innermost contact point P in contact points between the ball 3 and the inner surface of the pocket 11 and the center of the ball 3. Then, an inside diameter of the cage 4 is specified by an angle θ which is formed by the imaginary straight line L1 and a straight line L2 which passes through the center of the ball 3 in a direction which intersects a radial direction at right angles. As this occurs, in order to reduce the radial shift amount of the cage 4, the angle θ is preferably 25° or larger and is more preferably 30° or larger.]

[When the edge portions of the inner surface of the pocket are chamfered, as shown in FIG. 29, since a radially outermost portion of the chamfered portion 11c comes into contact with the ball 3, an imaginary line L1 is drawn by connecting that portion with the center of the ball 3. In addition, when the radial position of the cage 4 is positioned radially inward of the edge portions of the inner surface of the pocket 11 by other means, an imaginary straight line L1 is drawn by connecting a portion which first comes into contact with the ball 3 when the cage 4 is shifted radially inwards with the center of the ball 3.]

[Here, the results of an evaluation will be described which is made on a relationship between the angle θ and the radial shift amount. Bearings are prepared which are variously different in ratio of radius of curvature of the inner surface of the pocket to radius of the ball (pocket curvature radius/ball radius) and the angle θ and the bearings are investigated for a radial shift amount of the cage when rotating. There are prepared three ratios of pocket radius of curvature/ball radius, which are 101%, 103% and 106%. The results of the evaluation are shown in FIG. 30. The radial shift amount of the cage is indicated by a ratio to the diameter of the ball (cage shift amount/ball diameter (in %)).]

[It is seen from a graph in FIG. 30 that the radial shift amount of the cage is small when the angle θ is 25° or larger and that the radial shift amount of the cage becomes smaller when the angle θ is 30° or larger. However, in case the angle θ formed becomes too large, the cage becomes easy to be brought into contact with the outer circumference of the inner ring. Consequently, the angle θ is 50° or smaller and is more preferably 40° or smaller. More specifically, it is preferable that the angle θ stays within the range and as is described above, the gap between the inside diameter of the cage and the outside diameter of the inner ring is 2% or more and 10% or less of the outside diameter of the inner ring and is more preferable that the gap is 2% or more and 7% or less.]

[The ball bearings of the first embodiment and the second embodiment are suitable for use as a ball bearing which supports rotatably a rotating shaft of a drive motor or a generator (for example, an alternator) of a hybrid vehicle. Consequently, a transmission of a hybrid vehicle which incorporates the ball bearings of the first embodiment and the second embodiment can preferably be used even in high-temperature, high-speed conditions.]

[Embodiment 3]

FIG. 31 shows a ball bearing according to [a third] *an* embodiment of the invention. As shown in FIG. 31, this ball bearing includes an inner ring 31 having a raceway surface 1a (a raceway groove) [on] *in* an outer circumferential surface *31a* thereof, an outer ring 32 having a raceway surface 2a (a raceway groove) [on] *in* an inner circumferential surface *32a* thereof, a plurality of balls (steel balls) 3 which are disposed rollably between the raceway surface 1a of the inner ring 31 and the raceway surface 2a of the outer ring 32, a resin crown type cage 34 for retaining the balls 3 at given intervals in a circumferential direction, and an annular lubricant guide 5 made of a thin plate and [provided at] *inset with respect to* an axial end face side of the inner ring 31 and the outer ring 32.

As shown in FIG. 32, the crown type cage 34 includes an annular base portion 4a, a plurality of pillar portions 4b [which are provided on an axial end face of] *protruded from* the base portion 4a [so as to project therefrom so as to be] *and* aligned at given intervals and spherical pockets 4c each having a spherical internal surface [secured] *formed* between the adjacent pillar portions 4b. The crown type cage 34 retains the balls 3 at given intervals in the circumferential direction by accommodating the balls 3 individually in the corresponding spherical pockets 4c.

As examples of resins of which the crown type cage 34 is formed, there are raised polyamide based resins such as nylon 46 and nylon 66, polybutylene terephthalate, polyphenylene sulfide (PPS), polyamide-imide (PAI), thermoplastic polyimide, polyether ether ketone (PEEK), polyether nytril (PEN) and the like. In addition, the rigidity and dimension accuracy of the crown type cage 34 can be increased by adding as required 10 to 40 wt % fabric filler (for example, glass fibers or carbon fibers) to the aforesaid resins.

The crown type cage 34 is preferably fabricated through injection molding with a multiple-gate mold. By adopting this fabrication method, the dimension accuracy of the crown type cage 34 can be increased compared with a fabrication using a single-gate mold. In addition, by being fabricated with the multi-gate mold, since a weld portion can be offset from a pocket bottom which constitutes a weakest portion of the cage, a reduction in strength due to the weld portion can be prevented.

This ball bearing is used under an environment in which lubricating oil for lubricating an interior of the bearing is supplied from an axial side S1 relative to the balls 3 and is discharged from the other axial side S2 relative to the balls 3. The crown type cage 34 is disposed so that the base portion 4a faces the lubricating oil supply side S1 which is the axial side, and the lubricating oil so supplied is guided to sliding portions between the balls 3 and the cage 34.

The lubricant guide 5 is [tightened] *abutted to the outer ring 32* at the lubricating oil supply side *S1* of the [outer ring 32] *bearing*. The lubricant guide 5 is fixed to the outer ring *32* by bringing an outer circumferential end 5a *of the lubricant guide 5* into engagement with an engagement groove 2b formed in a *first* shoulder portion [to a side of the outer ring raceway surface 2a] *2c* of the outer ring 32[, and a] *wherein the engagement groove 2b is spaced inward from the lubricating oil supply side S1. A* lubricant guide portion 5b is allowed to extend towards a shoulder portion 1b [to a side of the inner ring raceway surface 1a] of the inner ring 31. An annular opening portion 51 into which the lubricating oil is supplied is formed between an inner circumferential portion 5c of the lubricant guide 5 and an outer circumferential portion of the shoulder portion 1b of the inner ring 31.

In this case, a tapered cutout *portion* 1c is provided at the shoulder portion 1b of the inner ring 31 which faces the inner circumferential portion 5c of the lubricant guide 5[, and the]. *The* annular opening portion *51* into which the lubricating oil is supplied is formed between an outer circumferential *surface* of the tapered cutout *portion* 1c and the inner circumferential portion 5c of the lubricant guide 5. This tapered cutout *portion* 1c extends *from an axial end 1f* further axially inwards [than] *relative to* a bottom of the spherical pocket in the crown type cage 34 so as to enhance the lubricating oil flow into the bearing. *There is a second shoulder portion 1g of the inner ring 31 defining an inner portion of a discharge opening 52. There is also a second shoulder portion 2f of the outer ring 32 at an outer portion of the discharge opening 52, and the engagement groove 2b is nearer to an axial end 2d of the outer ring 32 than to an opposite axial end 2e.*

Figure 33B:
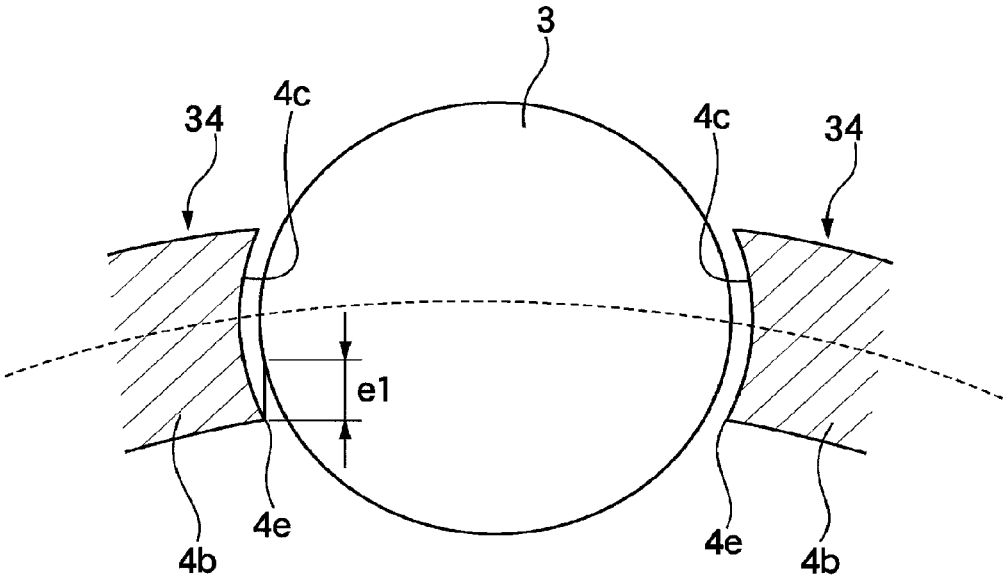
FIG. 33B is a diagram showing a configuration in which the center of the cage in the radial thickness direction thereof coincides with the center of the ball.

As shown in FIGS. 31 and 33A, a radial widthwise center 4h of the crown type cage 34 is offset toward the radially inner side of the bearing [than] *relative to* a center O3 of the ball 3 in order to increase the holding amount of the ball 3. In this way, when the crown type cage 34 is offset towards the radially inner side to increase the holding amount of the ball 3, compared with a case in which the center of the radial width of the cage 34 coincides with the center of the ball 3 (see FIG. 33B), a radial gap e2 between an edge 4e of an inner circumferential portion of the cage 34 and the ball 3 can be made smaller than a gap e1 in FIG. 33B when the crown type cage 34 is expanded outwards by centrifugal force. Consequently, a radially outward deformation of the cage 34 can be suppressed to a small level, as a result of which a warp can be suppressed further so as to prevent the contact of the cage 34 with the outer ring 32 [than] *compared with* a case where the holding amount is small as in FIG. [33] *33B*.

An outside diameter surface of the inner ring 31 functions as a guide for rotation of the cage 34 by reducing a distance between the outside diameter surface of the inner ring 31 and an inner circumferential portion of the cage 34, so as to suppress the radial play of the cage 34, whereby an effect can be expected which prevents the rotation of the cage 34 with run-out. Note that when the bearing is rotating normally, the cage 34 is guided by the balls and the cage 34 is prevented from being brought into contact with the inner ring 31, and therefore, there is caused no such situation in which bearing torque is increased. In addition, when a force such as an impact force is exerted abruptly on the cage 34, although there is a possibility that the cage 34 and the inner ring 31 come into contact with each other, even in such a case, compared with a case where the cage 34 contacts the outer ring 32, the increase in bearing torque is allowed to remain at a small level. In particular, when the bearing is used under conditions where an impact force is exerted thereon, the guide of the cage 34 may be switched from the ball guide to an inner ring guide.

Figure 34A:
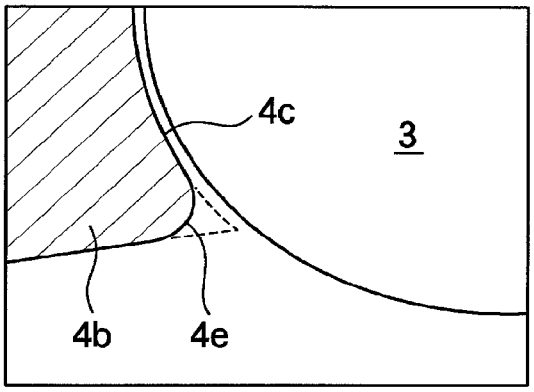
FIG. 34A is a diagram showing a configuration in which an edge of an inner circumferential portion of a spherical pocket in the cage is rounded.
Figure 34B:
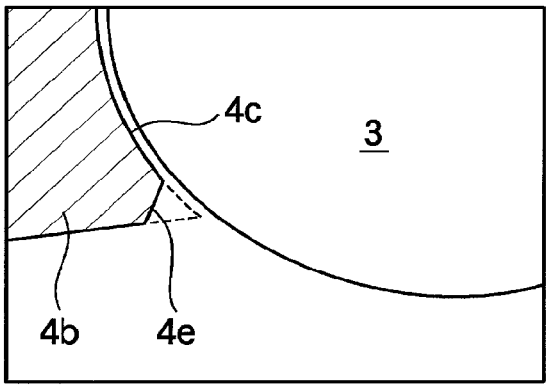
FIG. 34B is a diagram showing a configuration in which the edge of the inner circumferential portion of the spherical pocket in the cage is chamfered.
Figure 34C:
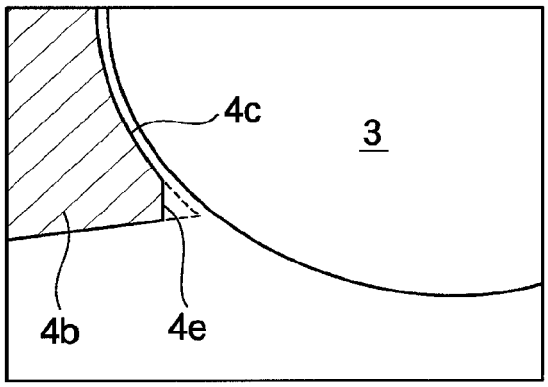
FIG. 34C is a diagram showing another configuration in which the edge of the inner circumferential portion of the spherical pocket in the cage is chamfered.

Further, as shown in FIG. 34A, the edge 4e of the inner circumferential portion of the spherical pocket 4c is rounded. As described above, when the inside diameter of the cage 34 becomes small, as indicated by imaginary lines in FIG. 34A, the edge 4e of the inner circumferential portion of the spherical pocket 4c becomes sharp, and this portion tends to wear easily. Then, the wear can be prevented by the edge 4e being rounded in section. As shown in FIGS. 34B and 34C, the edge 4e may be chamfered, and as this occurs, partial rounding or chamfering may be applied only to a bottom of the spherical pocket 4c or distal ends of claws. In addition, as shown in FIG. 34C, when a cylindrical chamfering is applied, compared with the rounding and chamfering shown in FIGS. 34A and 34B, an injection mold can be fabricated easily and costs for fabrication can be suppressed, which is preferable.

In addition, as shown in FIG. 31, in the ball bearing[in the third embodiment], the center O3 of the ball 3 is offset by a suitable dimension *F* closer to the lubricating oil discharge side *S2* than the center position C of the inner ring 31 and the outer ring 32. When the position of the ball 3 is offset towards the discharge side S2 of the lubricating oil in the way described above, the axial distance between the lubricant guide 5 disposed at the supply side S1 of the lubricating oil and the ball 3 is expanded. Consequently, a large thickness can be ensured accordingly for a bottom thickness J (a thickness of the base portion 4a) of the spherical pocket 4c of the crown type cage 34. In this way, when the bottom thickness J of the spherical pocket 4c of the cage 34 is increased, the rigidity of the crown type cage 34 can be increased accordingly, whereby the effect of suppressing the warping by the centrifugal force is increased.

In addition, a bent wall 5d, which is bent towards the interior of the bearing, is provided at an inner circumferential portion of the lubricant guide 5. When the bent wall 5d extending towards the interior of the bearing is provided, the lubricating oil that has flowed in from the annular opening portion 51 is guided to the bent wall portion 5d so as to be directed towards the inner circumferential portion of the crown type cage 34 without being directed radially outward by centrifugal force right after the introduction into the annular opening portion 51, whereby the lubricating oil is allowed to positively flow into portions needing lubrication.

Additionally, an inside diameter Ds of the inner circumferential portion 5c of the lubricant guide 5 is [equal to or] smaller than a revolution diameter PCD of the ball 3 and is more preferably *smaller than* an inside diameter Dh of the crown type cage 34.

A shortest distance y between the outer circumferential portion of the inner ring 31 and the inner circumferential portion 5c of the lubricant guide 5 which define the annular opening portion 51 is set to 9% or more of a diameter Dw of the ball 3 and is more preferably 11% or more. In this case, assuming that the inside diameter of the lubricant guide 5 is Ds and the outside diameter of the shoulder portion 1b of the inner ring 31 is Dl, the shortest distance y is $$y=(Ds-Dl)/2.$$

According to the ball bearing of the [third] embodiment, since the annular opening portion 51 is formed at the axial supply side between the inner circumferential portion 5c of the lubricant guide 5 fixed to the outer ring 32 and the outer circumferential portion of the inner ring 31, the lubricating oil can be introduced into the interior of the bearing from the annular opening portion 51. Then, the lubricating oil that flows into the interior of the bearing flows into the sliding portions between the balls 3 and the crown type cage 34 by centrifugal force after having flowed towards the radially inner side of the cage 34 and is discharged to the outside of the bearing from an annular opening opened at the axial discharge side between the inner and outer rings 31, 32 in such a state that the flow rate is increased further by centrifugal force. Note that arrows in FIG. 31 indicate the flow of lubricating oil.

In this way, since the lubricating oil supplied into the interior of the bearing flows into the sliding portions between the balls 3 and the crown type cage 34 from the radially inner side of the cage 34 by centrifugal force, the wear of the cage 34 can be suppressed which is caused by the sliding of the balls 3 on the cage 34 which tends to be generated easily when rotating at high speeds without employing a device such as a lubrication nozzle which requires extra space and cost. As a result, the rotation of the crown type cage 34 with run-out can be prevented, thereby making it possible to realize a long life of the bearing. In addition, since the lubricating oil can be discharged to the outside of the bearing in such a state that the flow rate is increased by centrifugal force, the ingress and egress of lubricating oil can be implemented effectively, thereby making it possible to prevent the increase in both temperature and torque of the bearing.

In addition, since the resin crown type cage 34 can be injection molded, cages can be mass produced, and hence, lubricating conditions can be improved while suppressing costs. The ball-guided crown type cage 34 can contribute to the reduction in torque.

Additionally, by making the inside diameter Ds of the lubricant guide 5 [equal to or] smaller than the inside diameter Dh of the crown type cage 34, the lubricating oil that has entered the interior of the bearing from the annular opening portion 51 can flow in towards the radially inner side of the crown type cage 34 in a more ensured fashion. In addition, an excessive lubricant can be prevented from entering the interior of the bearing.

Since the radial widthwise center 4h of the crown type cage 34 is offset towards the radially inner side of the bearing from the center O3 of the ball 3, the holding amount of the balls 3 by the crown type cage 34 can be increased, whereby the warp of the crown type cage 34 can be suppressed.

In addition, since the center O3 of the ball 3 is offset to the discharge side S2 of the lubricating oil, a large distance can be secured between the lubricant guide 5 disposed at the supply side 51 of the lubricating oil and the ball 3. Consequently, due to the space between the ball 3 and the lubricant guide 5 being expanded, the axial thickness of the base portion 4a of the crown type cage 34 facing the supply side S1 of the lubricating oil, that is, the bottom thickness J of the spherical pocket 4c can be increased. As a result, the rotation of the crown type cage 34 with run-out can be suppressed.

Additionally, since the tapered cutout 1c is provided at the shoulder portion 1b of the inner ring 31 which is situated on the side where the lubricant guide 5 is disposed, the inside diameter Ds of the lubricant guide 5 can made small, while ensuring that the annular opening portion 51 into which the lubricating oil flows is kept slightly larger. As a result, the lubricating oil can be introduced towards the radially *inner* side of the crown type cage 34 in an ensured fashion, facilitating the introduction of the lubricating oil to the sliding portions between the spherical pockets 4c and the balls 3.

In addition, since the bent wall 5d extending towards the interior of the bearing is provided at the inner circumferential portion 5c of the lubricant guide 5, the lubricating oil that flows [in] from the annular opening portion 51 [secured] *formed* between the inner circumferential portion 5c of the lubricant guide 5 and the outer circumferential portion of the inner ring 31 can be guided positively in the direction of the inner circumferential portion of the crown type cage 34 by overcoming the centrifugal force.

Additionally, since the edges 4e of the inner circumferential portion of the spherical pocket 4c of the crown cage 34 are chamfered or rounded, even when the edges 4e are brought into contact with the ball 3, the concentration of stress on the cage side 34 can be relaxed, thereby making it possible to reduce the wear of the cage 34. In particular, when the inside diameter of the crown type cage 34 is reduced, while the edges 4e become sharp, by chamfering or rounding the edges 4e, a reduction in wear can be realized.

In addition, since the inside diameter Ds of the lubricant guide 5 is [equal to or] smaller than the revolution diameter PCD of the ball 3 and is more preferably [equal to or] smaller than the inside diameter of the crown type cage, it becomes possible to increase the performance of sending the lubricating oil to the portions requiring lubrication by the lubricant guide 5, thereby making it possible to improve the lubricating conditions of the bearing. In particular, when the shortest distance y between the outer circumferential portion of the inner ring 31 and the inner circumferential portion 5c of the lubricant guide 5 is 9% or more of the diameter Dw of the ball 3, a reduction in rotation of the crown type cage 34 with run-out can be realized. Further, when the shortest distance y between the outer circumferential portion of the inner ring 31 and the inner circumferential portion 5c of the lubricant guide 5 is 11% or more of the diameter Dw of the ball 3, a reduction in rotation of the crown type cage 34 with run-out can be realized in a more ensured fashion.

Figure 35:
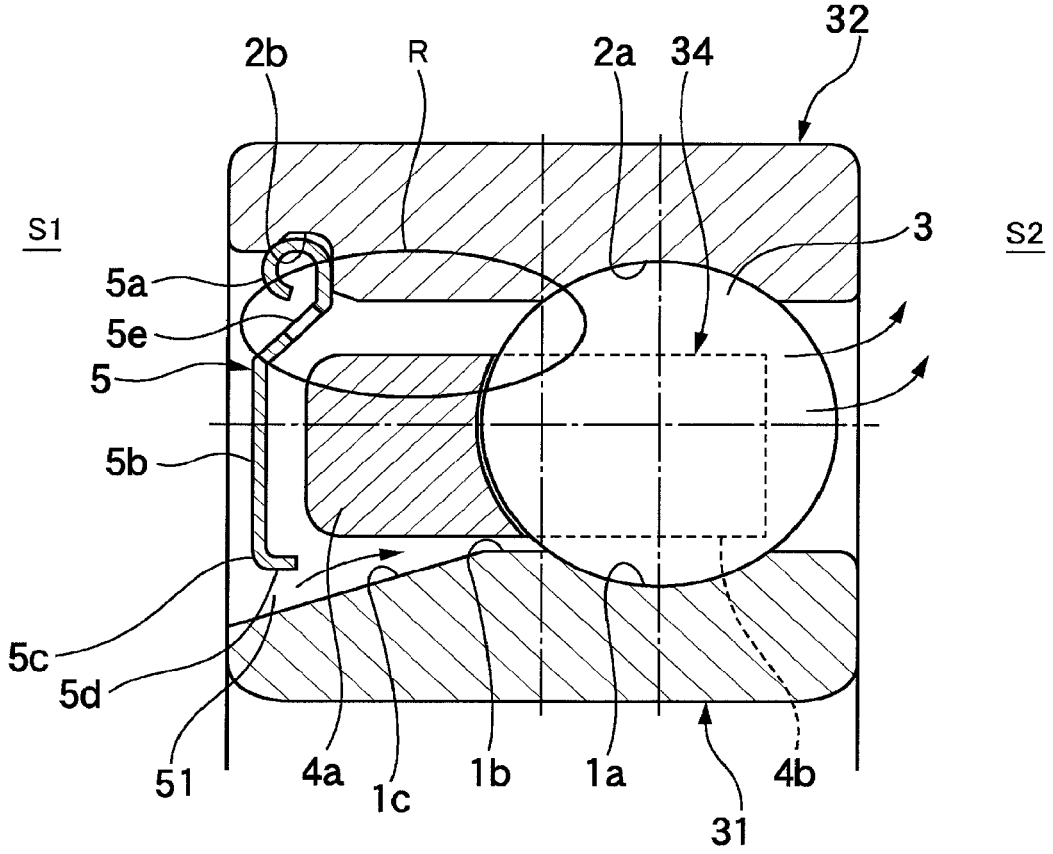
FIG. 35 is a sectional view of a main part of a ball bearing of a first modified example of the [third] embodiment of [the invention] *FIG. 31*.
Figure 42:
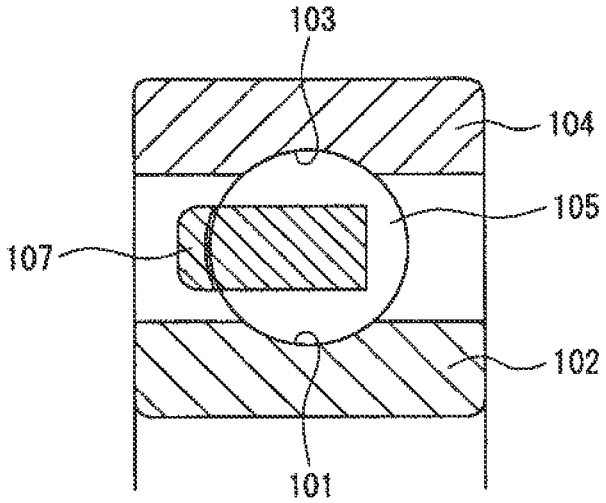
FIG. 42 PRIOR ART
FIG. 42 is a partial sectional view of a ball bearing according to a first conventional example.
Figure 43:
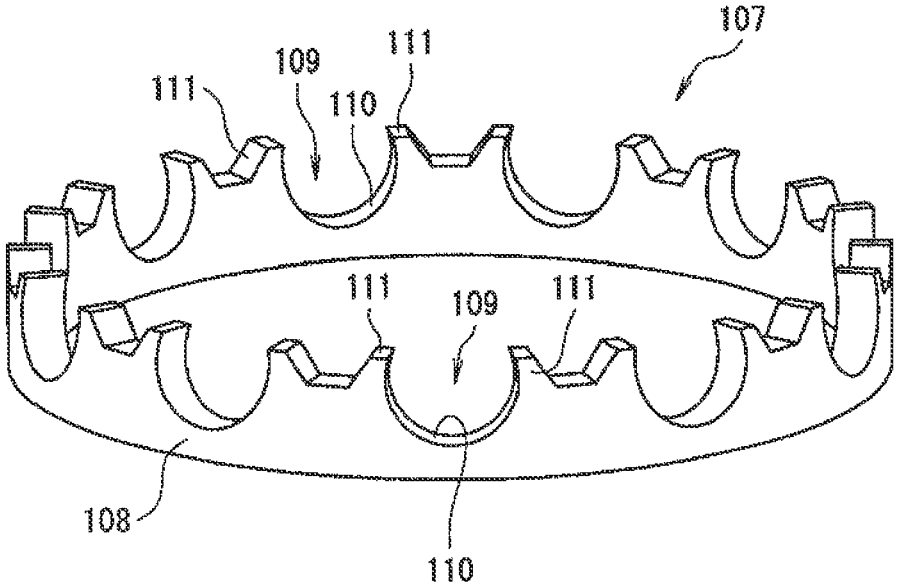
FIG. 43 PRIOR ART
FIG. 43 is a perspective view of a cage of the ball bearing in FIG. 42.
Figure 44:
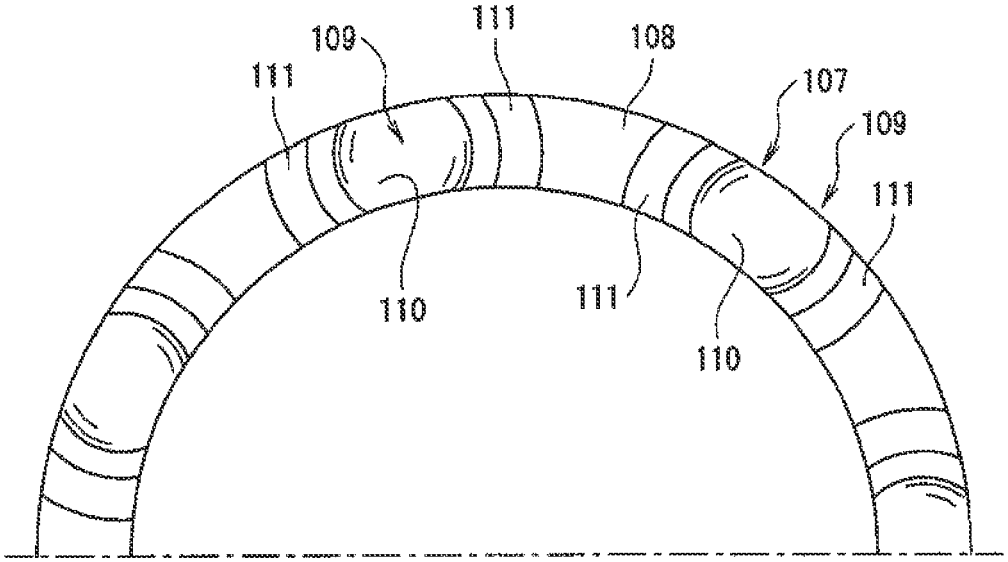
FIG. 44 PRIOR ART
FIG. 44 is a partial plan view of the cage in FIG. 43.

FIG. 35 shows a ball bearing according to a first modified example [of the third embodiment]. In this ball bearing, a through hole 5e which allows for the passage of lubricating oil is provided near an outer circumference of a lubricant guide 5 which is situated further radially inwards [than] *relative to* an inner circumferential portion of an outer ring 32. By adopting this configuration, since the lubricating oil can freely escape through the through hole 5e provided near the outer circumference of the lubricant guide 5, the replacement efficiency of lubricating oil can be increased in a region R in an interior of the bearing which is situated on an outer circumferential side of the interior of the bearing, thereby making it possible to prevent the portion in question from being heated. The other configurations and advantages are similar to those of the [third] embodiment *of FIG. 31*.

[FIGS. 36A to 36E show ball bearings according to a second modified example to a sixth modified example of the third embodiment, respectively. Note that these modified examples have the same configurations and advantages as those of the third embodiment except portions that will be described below.]

[A ball bearing according to the second modified example shown in FIG. 36A has a stepped cutout 1d formed at a shoulder portion 1b of an inner ring 31 in place of the tapered cutout 1c.]

[A ball bearing according to the third modified example shown in FIG. 36B has a stepped cutout 1d formed at a shoulder portion 1b of an inner ring 31 in place of the tapered cutout 1c. Further, a bent wall 5d extends as far as a position where it enters a circumferential side of a base portion 4a of a crown type cage 34.]

[A ball bearing according to the fourth modified example shown in FIG. 36C has a stepped cutout 1d formed at a shoulder portion 1b of an inner ring 31 in place of the tapered cutout 1c. However, a lubricant guide 5 has no bent wall 5d. In this case, since no bent wall 5d is present, lubricating oil that flows in from an annular opening portion 51 tends to be directed in an outside diameter direction by centrifugal force. However, since kinetic energy is given to the lubricating oil at a point in time when the lubricating oil flows into an interior of the bearing from the annular opening portion 51, the lubricating oil can satisfactorily be guided to the inner circumferential portion of the crown type cage 34.]

[A ball bearing according to the fifth modified example shown in FIG. 36D has a configuration in which no cutout is formed at a shoulder portion 1b of an inner ring 31, and an inner circumferential portion of a crown type cage 34 lies close to an outside diameter surface of the inner ring 31. In addition, a lubricant guide 5 has no bent wall 5d.]

[A ball bearing according to the sixth modified example shown in FIG. 36E has a configuration in which no cutout is formed at a shoulder portion 1b of an inner ring 31. In addition, a crown type cage 34 is used in which a center of a radial width of the cage 34 coincides with the center of a ball 3, so that the contact of an inner circumferential portion of the crown type cage 34 with an outside diameter surface of the inner ring 31 is suppressed. In addition, the inside diameter of a lubricant guide 5 becomes smaller than an inside diameter of the cage 34 by employing the cage 34, facilitating the passage of lubricating oil between an inner circumferential side of the cage 34 and the inner ring 31.]

[FIGS. 37A to 37D show ball bearings according to seventh to tenth modified examples of the third embodiment, respectively. For example, in the third embodiment, while the lubricant guide 5 is attached directly to the shoulder portion of the outer ring 32, as in the seventh and eighth modified examples shown in FIGS. 37A and 37B, respectively, a side plate 35, 45 may be provided on an external surface of an outer ring 32, and an annular projecting portion 35a provided on the side plate 35 or the side plate 45 itself may be used as a lubricant guide. In addition, as in the ninth and tenth modified examples shown in FIGS. 37C and 37D, respectively, an inwardly facing flange portion 55, 65 may be provided on a housing 50, 60 to which an outer ring 32 is fixed so as to face inwards, and an annular projecting portion 35a provided on the flange portion 55 or the flange portion 65 itself may be used as a lubricant guide.]

[By adopting this configuration, the number of components can be reduced. In addition, the step of crimping the outer circumferential end of the lubricant guide into the engagement groove in the outer ring can also be omitted, whereby costs are reduced. In addition, in the seventh to tenth modified examples, compared with the configuration in which the lubricant guide is fixed to the outer ring 32, a space can easily be provided at one axial side between an inner ring 31 and the outer ring 32, thereby making it possible to increase the thickness of a base portion 4a of a cage 34.]

[Further, in the third embodiment, while the shield plate, which is not in contact with the outer circumferential surface of the shoulder portion 1b of the inner ring 31 is used as the lubricant guide, in the case of a contact seal is used, a supply hole may be provided on an inner circumferential portion side of the lubricant guide.]

[In addition, as cages to which the invention can be applied, the invention can also be applied to other cages which include a ribbon type pressed cage and a duplex cage made by bringing two members into engagement with each other.]

[Next, an example of a test for measuring a radial play of a cage will be described by using a ball bearing shown in FIG. 38. This ball bearing has substantially the same configuration as that of the ball bearing according to the fourth modified example shown in FIG. 36C. In Test 1, an outside diameter Dl of an end portion of a shoulder portion 1b of an inner ring 31 is changed, and in Test 2, an inside diameter Ds of a lubricant guide 15 is changed.]

[<Test 1>]

[In Test 1, as an index of wear loss, an increased amount of a radial play of a cage as compared with a new cage was surveyed while changing y/Dw (gap/ball diameter) by changing the outside diameter Dl of the end portion of the shoulder portion 1b of the inner ring 31 with the inside diameter Ds of the lubricant guide 15 fixed at 51.8 mm. The configuration of the bearing and testing conditions were as follows.]

[<Configuration of Bearing>]

[Bearing Type: 6909 (PCD=56.5 mm)]

[Ball Diameter: 6.7 mm]

[Cage: Crown Type Cage having Spherical Pockets]

[Cage Material Nylon 46 reinforced with 25% Glass Fibers]

[Distance Db between Base Portion of Cage and Lubricant Guide Portion of Lubricant Guide: 1 mm]

[Cage Inside Diameter: 51.8 mm]

[<Testing Conditions>]

[Rotation speed: 30000 rpm]

[Temperature of Lubricating Oil Supplied: 120° C.]

[Lubrication Method Supply of Mineral Oil of VG24 through Forced Lubrication (0.1 L/min)]

[Load: 2500 N]

[Testing Time: 20 Hr]

[The results of the test are shown in Table 1 and in FIG. 39.]

[TABLE 1]

| [Inner Ring] [Outside] [Diameter (mm)] | [Opening] [Amount] [(mm)] | [y/Dw] | [Radial Play of] [Cage (mm) (Difference] [from New Product)] |
|---|---|---|---|
| [51.4] | [0.2] | [3] | [heat-seizure] |
| [51.2] | [0.3] | [5] | [1.13] |
| [50.8] | [0.5] | [7] | [0.61] |
| [50.6] | [0.6] | [9] | [0.18] |
| [50.4] | [0.7] | [10] | [0.06] |
| [49.8] | [1.0] | [15] | [0.04] |
| [48.4] | [1.7] | [25] | [0.07] |

[It is seen from the results of the wear test shown in FIG. 39 that when y/Dw is 9% or larger, the improvement in starting time of rotation with run-out of the bearing comes almost to a saturation, and when y/Dw is 11% or larger, the improvement in starting time of rotation with run-out of the bearing comes completely to a saturation. It is verified from this fact that when y/Dw is 9% or larger and is preferably 11% or larger, a large effect can be obtained on the reduction of rotation with run-out of the ball bearing. In addition, when y/Dw is 3% or smaller, an annular opening portion 51 is so narrow that lubricating oil cannot be supplied sufficiently, resulting in heat-seizure of the bearing.]

[<Test 2>]

[In Test 2, in a ball bearing as shown in FIG. 38, as an index of wear loss, an increased amount of a radial play of a cage as compared with a new cage was surveyed while changing the inside diameter Ds of a lubricant guide 15 with an outside diameter Dl of an inner ring 31 fixed at 48.4 mm. However, y/Dw was set to be 11% or more at which the starting time of rotation with run-out of the bearing stayed in the saturation region at all times in Test 1. The configuration of the bearing and testing conditions were the same as those of Test 1.]

[The results of the test are shown in Table 2 and in FIG. 40.]

[TABLE 2]

| [Annular] [Plate Inside] [Diameter (mm)] | [Opening] [Amount] [(mm)] | [y/Dw] | [Radial Play of] [Cage (mm)] [(Difference from] [New Product)] | [Remarks] |
|---|---|---|---|---|
| [61.5] | [6.6] | [97] | [1.21] | [Outer Ring] [Inside Diameter] |
| [59.0] | [5.3] | [79] | [1.23] | |
| [56.6] | [4.1] | [60] | [0.90] | [Bearing PCD] |
| [54.0] | [2.8] | [41] | [0.20] | |
| [51.8] | [1.7] | [25] | [0.07] | [Cage Inside] [Diameter] |
| [50.0] | [0.8] | [12] | [0.06] | |

[It is seen from the results of the wear test shown in FIG. 40 that the wear loss starts to decrease somewhen at a pint in time when the inside diameter of the lubricant guide starts to be lowered to and beyond the PCD of the bearing. It can be considered that this is because lubricating oil is made difficult to flow into a cage 34 and much of the lubricating oil then starts to flow to a radially inner side of the cage 34. This effect comes almost to a saturation when the inside diameter Ds of the lubricant guide 15 is lowered to and beyond the inside diameter Dh of the cage 34. It is seen from these facts that the inside diameter Ds of the lubricant guide 15 should be equal to or smaller than the PCD of the bearing and be preferably equal to or smaller than the inside diameter Dh of the cage 34.]

[<Test 3>]

[Next, heat generation amounts were compared by changing only the radius of curvature R of the grooves in the raceway surfaces of the inner ring and the outer ring in the dimensions of the bearing in the bearings used in Test 1 which indicated the smallest play amount, the outside diameter of the inner ring being 49.8 mm, the opening amount being 1.0 mm, and y/Dw of the bearing being 15%, respectively. The results of Test 3 are shown in FIG. 41. In a graph in FIG. 41, an axis of abscissae denotes Ri=radius of curvature R of groove in raceway surface of inner ring/ball diameter, and an axis of ordinates denotes a ratio of heat generation amounts when a heat generation amount when Re=radius of curvature of groove in raceway surface of outer ring/ball diameter=0.52 and Ri=0.52 is referred to as 1.0. It is seen from the test results shown in FIG. 41 that irrespective of radius of curvature R of the groove in the raceway surface of the outer ring, it is favorable when the radius of curvature R of the groove in the raceway surface of the inner ring is equal to or larger than 53% (Ri≥0.53), in which not much heat is generated.]

Thus, while the [embodiments] *embodiment* and the modified [examples] *example* thereof have been described, the invention is not limited to the [embodiments] *embodiment* and the modified [examples] *example* thereof, and hence, it is obvious to those skilled in the art to which the invention pertains that various alterations and modifications can be made thereto without departing from the spirit and scope of the invention. For example, the materials, shapes, dimensions, numbers and disposition locations can be altered or modified as required.

[In addition, the characteristics of the embodiments and the modified examples thereof may be combined together.]

Additionally, in the [embodiments] *embodiment* and the modified [examples] *example* thereof, while the deep groove ball bearing is described as the ball bearing to which the invention is applied, the invention can be applied to other various types of ball bearings (for example, angular contact ball bearings and self aligning ball bearings).

INDUSTRIAL APPLICABILITY

The invention provides the ball bearing which can suitably be used even under high-temperature, high-speed conditions and a hybrid vehicle transmission.

The invention claimed is:

1. A ball bearing comprising:

an inner ring comprising *an outer circumferential surface wherein the outer circumferential surface has a tapered portion extending from an axial end of the inner ring to a first shoulder portion of the inner ring and defining a boundary of an annular supply opening, a second shoulder portion of the inner ring defining a portion of an annular discharge opening, and* a raceway *groove provided between the first shoulder portion of the inner ring and the second shoulder portion of the inner ring, the raceway groove defining a raceway* surface [on an] *in the* outer circumferential surface[thereof];

an outer ring comprising *an inner circumferential surface wherein the inner circumferential surface has a first shoulder portion of the outer ring having an engagement groove nearer to an axial end of the outer ring than to an opposite axial end of the outer ring, a second shoulder portion of the outer ring defining another portion of the annular discharge opening, and* a raceway *groove provided between the first shoulder portion of the outer ring and the second shoulder portion of the outer ring, the raceway groove of the outer ring defining a raceway* surface [on an] *in the* inner circumferential surface[thereof]; *and* a plurality of balls rollably disposed between the raceway surface *of the raceway groove* of the inner ring and the raceway surface *of the raceway groove* of the outer ring;

a cage configured to retain the plurality of balls at intervals in a circumferential direction, the cage being a crown type cage comprising a base portion and a plurality of pillar portions protruded [on an axial end face of] *axially from* the base portion, the [bails] *balls* being accommodated in spherical pockets formed between the pillar portions; and an annular lubricant guide [fixed to] *in fixed engagement with the engagement groove of the outer ring at* an axial end portion of the outer ring and extending towards [a shoulder portion] *the tapered portion* of the inner ring,

[wherein an annular opening portion is formed between an inner circumferential portion of the lubricant guide and the outer circumferential surface of the inner ring to supply lubricating oil into an interior of the ball bearing, and]

*wherein the tapered portion of the inner ring faces an inner circumferential portion of the lubricant guide,*

[wherein the ball bearing is used under an environment in which the lubricating oil is supplied from one side in an axial direction with respect to the balls and is discharged from the other side in the axial direction with respect to the balls,]

wherein the lubricant guide is provided only on [said one] *a first* side in [the] *an* axial direction *with respect to the balls*, [the other side being an annular] *the annular supply opening is formed between the inner circumferential portion of the lubricant guide and the tapered portion of the inner ring to supply lubricating oil into an interior of the ball bearing, and the discharge* opening [extending] *is on a second side in the axial direction with respect to the balls and extends* radially between the outer ring inner circumferential surface and the inner ring outer circumferential surface *to discharge the lubricating oil from the interior of the ball bearing*, and

*wherein the ball bearing is used in an environment in which the lubricating oil is supplied from the first side in the axial direction with respect to the balls and is discharged from the second side in the axial direction with respect to the balls,* wherein the base portion of the cage is disposed to face [said one] *the first* side in the axial direction*; and*

*wherein the inner circumferential portion of the lubricant guide comprises a bent wall extending toward the interior of the bearing;*

*wherein a radial widthwise center of the cage is offset radially inwards relative to a center of each of the balls,*

*wherein the center of each of the balls is offset towards the second side in the axial direction relative to axial widthwise centers of the inner ring and the outer ring,*

*wherein an inside diameter of the lubricant guide is smaller than an inside diameter of the cage, and*

*wherein a shortest distance between the tapered portion of the inner ring and the inner circumferential portion of the lubricant guide is 11% or more of the diameter of each of the balls.*

[2. The ball bearing as set forth in claim 1, wherein a radial widthwise center of the cage is offset radially inwards than a center of each of the balls.]

[3. The ball bearing as set forth in claim 1, wherein a center of each of the balls is offset toward the other side in the axial direction than axial widthwise centers of the inner ring and the outer ring.]

[4. The ball bearing as set forth in claim 1, wherein the shoulder portion of the inner ring that faces the inner circumferential portion of the lubricant guide comprises at least one of a tapered cutout portion and a stepped cutout portion.]

[5. The ball bearing as set forth in claim 1, wherein the inner circumferential portion of the lubricant guide comprises a bent wall which is bent toward the interior of the bearing.]

6. The ball bearing as set forth in claim 1, wherein [an edge] *edges* of [an] inner circumferential [portion] *portions* of the spherical [pocket] *pockets* of the cage [is] *are* chamfered or rounded.

[7. The ball bearing as set forth in claim 1, wherein an inside diameter of the lubricant guide is equal to or smaller than an inside diameter of the cage, and wherein a shortest distance between the outer circumferential portion of the inner ring and the inner circumferential portion of the lubricant guide which form the annular opening portion is 11% or more of the diameter of the ball.]

[8. The ball bearing as set forth in claim 1, wherein the lubricant guide and a housing to which the outer ring is fixed are formed as a one-piece structure.]

* * * * *